United States Patent
Cavalheiro et al.

(10) Patent No.: US 12,206,227 B2
(45) Date of Patent: Jan. 21, 2025

(54) WIRE MIGRATION DEVICES, SYSTEMS, AND METHODS

(71) Applicant: Schneider Electric USA, Inc., Andover, MA (US)

(72) Inventors: Fabio Cavalheiro, Andover, MA (US); Ken Holland, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/866,384

(22) Filed: Jul. 15, 2022

(65) Prior Publication Data

US 2024/0022059 A1    Jan. 18, 2024

(51) Int. Cl.
*H02G 11/00* (2006.01)
*H02G 3/32* (2006.01)
(Continued)

(52) U.S. Cl.
CPC ............... *H02G 11/00* (2013.01); *H02G 3/32* (2013.01); *B65H 51/005* (2013.01); *B65H 2701/34* (2013.01); *H02G 1/00* (2013.01)

(58) Field of Classification Search
CPC ............ H02G 11/00; H02G 3/32; H02G 1/00; B65H 51/005; B65H 2710/34
See application file for complete search history.

(56) References Cited

U.S. PATENT DOCUMENTS 3,535,969 A * 10/1970 Bunger ..................... G10H 1/06
                                                         984/324
5,363,539 A * 11/1994 Tisol ...................... F16L 3/2235
                                                         24/339

(Continued)

FOREIGN PATENT DOCUMENTS

| CN | 104348049 A | 2/2015 |
|---|---|---|
| CN | 106159838 A | 11/2016 |

(Continued)

OTHER PUBLICATIONS

Extended European Search Report dated Nov. 28, 2023, issued during the prosecution of European Patent Application No. EP23179935. 4.
Alarmtech, "Junction Box JB-RJ45", May 17, 2016, pp. 1-2, Retrieved from the Internet: URL: https://alarmtechglobal.com/img/cms/manuals/mcen/4-JB-RJ45-01_1620_en.pdf.
<https://www.walmart.com/ip/D-Line-Speed-D-Cable-Comb-12-Port-Cord-Organizer-Cable-Dresser-Wire-Manager-with-Labels-Pack-of-10/980507078,> Accessed on Oct. 31, 2022.

(Continued)

*Primary Examiner* — Tan Le
(74) *Attorney, Agent, or Firm* — Locke Lord LLP

(57) ABSTRACT

A wire comb can include a comb assembly defining a plurality of openings configured to organize and retain a plurality of wires associated with a first device. The comb assembly can be configured to allow insertion and organization of the plurality of wires in an open state, and to retain the plurality of wires in a relative position in a closed state. The wire comb can include first indicia disposed within the comb assembly on an interior surface of at least a portion of the comb assembly. The first indicia can be positioned to underlay the plurality of wires to allow the wires to be organized over the first indicia in accordance with the first indicia in the open state. The wire comb can include second indicia disposed on an outer surface of the comb assembly. The second indicia can be positioned to correspond to the plurality of wires retained within the comb assembly to allow the wires to be installed into terminals of a second device in accordance with the second indicia.

20 Claims, 38 Drawing Sheets

(51) Int. Cl.
*B65H 51/005* (2006.01)
*H02G 1/00* (2006.01)

(56) References Cited

U.S. PATENT DOCUMENTS

| | | | |
|---|---|---|---|
| 5,806,811 | A | 9/1998 | Viklund et al. |
| 6,549,427 | B1 | 4/2003 | Johnston |
| 7,019,213 | B1 | 3/2006 | McNutt et al. |
| 7,417,188 | B2 | 8/2008 | McNutt et al. |
| 7,677,024 | B2 | 3/2010 | Utaki |
| 8,342,459 | B2 | 1/2013 | Garrison et al. |
| 8,435,086 | B2 | 5/2013 | McGrath et al. |
| 9,485,892 | B2 | 11/2016 | Nakata |
| 9,699,936 | B1 * | 7/2017 | Vargas ............... A47B 97/00 |
| 9,958,090 | B2 | 5/2018 | Kellerman |
| 11,108,217 | B2 | 8/2021 | Winkler |
| 2008/0280471 | A1 | 11/2008 | Perez |
| 2010/0163278 | A1 * | 7/2010 | Grelck ................ H05K 7/1491 174/135 |
| 2012/0273627 | A1 | 11/2012 | Fritz et al. |
| 2014/0191457 | A1 | 7/2014 | Sharma et al. |
| 2015/0031236 | A1 * | 1/2015 | Konrad ................ H01R 4/30 439/579 |
| 2015/0101837 | A1 * | 4/2015 | Evangelista ......... H02G 15/113 29/525 |
| 2017/0063064 | A1 * | 3/2017 | Gintz .................... H02G 3/305 |
| 2019/0363527 | A1 | 11/2019 | Cao et al. |

FOREIGN PATENT DOCUMENTS

| | | | | |
|---|---|---|---|---|
| CN | 106532596 | A | | 3/2017 |
| CN | 106684782 | A | | 5/2017 |
| CN | 106786253 | A | | 5/2017 |
| CN | 106972431 | A | | 7/2017 |
| CN | 107732814 | A | | 2/2018 |
| CN | 107732815 | A | | 2/2018 |
| CN | 109066513 | A | | 12/2018 |
| CN | 110190567 | A | | 8/2019 |
| CN | 111132523 | A | | 5/2020 |
| CN | 111381640 | A | | 7/2020 |
| CN | 111596737 | A | | 8/2020 |
| CN | 111668736 | A | | 9/2020 |
| CN | 112209185 | A | | 1/2021 |
| CN | 112510604 | A | | 3/2021 |
| CN | 112803323 | A | | 5/2021 |
| CN | 113629604 | A | | 11/2021 |
| DE | 1035244 | B | | 7/1958 |
| DE | 1098070 | B | | 1/1961 |
| DE | 1891845 | U | | 4/1964 |
| DE | 1912968 | U | | 4/1965 |
| DE | 1254195 | B | | 11/1967 |
| DE | 1590504 | A1 | | 5/1970 |
| DE | 3432026 | A1 | | 3/1985 |
| DE | 19844582 | A1 | | 3/2000 |
| DE | 202009007626 | U1 | * | 11/2009 ........... H02G 3/0437 |
| DE | 202012003245 | U1 | | 4/2012 |
| EP | 0327330 | A2 | | 8/1989 |
| EP | 594821 | A1 | | 5/1994 |
| EP | 1320160 | A1 | | 6/2003 |
| EP | 2365596 | A2 | | 9/2011 |
| EP | 2975712 | A1 | | 1/2016 |
| ES | 2365340 | A1 | | 9/2011 |
| FR | 2109721 | A7 | | 5/1972 |
| FR | 2233731 | A1 | | 1/1975 |
| FR | 2538990 | A1 | | 7/1984 |
| KR | 200439820 | U | | 5/2008 |
| KR | 20100010784 | U | | 11/2010 |
| KR | 200462313 | Y1 | | 9/2012 |
| KR | 101288883 | B1 | | 7/2013 |
| KR | 101444318 | B1 | | 9/2014 |
| WO | 202157227 | A1 | | 4/2021 |

OTHER PUBLICATIONS

<https://www.grainger.com/product/454K53?ef_id=Cj0KCQjwgYSTBhDKARIsAB8KukuCcq_dPgvi6lxGS6qbSe_n-0tQy779tbxWeN2u6TtCnVq-hFayxQMaAovyEALw_wcB:G:s&s_kwcid=AL!2966!3!496359977965 !!!g!471328313888!&gucid=N:N:PS:Paid:GGL:CSM-2295:4P7A1P:20501231&gclid=Cj0KCQjwgYSTBhDKARIsAB8KukuCcq_dPgvi6lxGS6qbSe_n-0tQy779tbxWeN2u6TtCnVq-hFayxQMaAovyEALw_wcB&gclsrc=aw.ds,> Accessed on Oct. 31, 2022.
<https://www.amazon.com/Nanoxia-Aluminum-16-Pin-Sleeved-Extensions/dp/B07FFLCTZG?th=1,> Jul. 11, 2018.
<https://www.youtube.com/watch?v=UwQQCTkX7LI, > (2017).
<https://www.se.com/US/en/download/document/PAS_63680_CPM16074/,> Dec. 1, 2020.

* cited by examiner

WIRE MIGRATION DEVICES, SYSTEMS, AND METHODS

FIELD

This disclosure relates to wire migration in electrical systems.

BACKGROUND

Migrating wires from an old device to a new device can be a very tedious and time-consuming process. For example, with devices typically including a plurality of wires, and many of the plurality of wires having the same or similar colorings, it can be difficult to disconnect wires from the old device and correctly connect the wires to the new device. Labeling each of the wires can be a time-consuming process. Additionally, incorrect wire connections can cause safety hazards, and potentially cause damage to devices and result in lost time. Installing the wrong cable can present an electricity risk or unexpected/unwanted behavior.

Conventional methods and systems have generally been considered satisfactory for their intended purpose. However, there is still a need in the art for improved wire migration devices, systems, and methods. The present disclosure provides a solution for this need.

SUMMARY

A wire comb can include a comb assembly defining a plurality of openings configured to organize and retain a plurality of wires associated with a first device. The comb assembly can be configured to allow insertion and organization of the plurality of wires in an open state, and to retain the plurality of wires in a relative position in a closed state. The wire comb can include first indicia disposed within the comb assembly on an interior surface of at least a portion of the comb assembly. The first indicia can be positioned to underlay the plurality of wires to allow the wires to be organized over the first indicia in accordance with the first indicia in the open state. The wire comb can include second indicia disposed on an outer surface of the comb assembly. The second indicia can be positioned to correspond to the plurality of wires retained within the comb assembly to allow the wires to be installed into terminals of a second device in accordance with the second indicia.

The first indicia can be different than the second indicia (e.g., where the first device has a different terminal arrangement and/or nomenclature than the second device). In certain embodiments, the first indicia can be the same as the second indicia.

In certain embodiments, the comb assembly can include a first housing portion and a second housing portion configured to assemble together. The first housing portion can include the interior surface having the first indicia.

The first housing portion can define a rim structure extending away from the interior surface. The rim structure can include comb teeth configured to receive a wire or the plurality of wires between adjacent teeth. In certain embodiments, the rim structure can include a first rim portion and a second rim portion disposed on an opposite side of the interior surface relative to the first rim portion. The first rim portion can have first comb teeth and the second rim portion can have second comb teeth.

The first comb teeth and second comb teeth can be aligned to form a plurality of slots. The first indicia can include a wire indication relative to each of the plurality of slots. The second housing portion can be configured to clip to the first housing portion.

The first housing portion and/or the second housing portion can include one or more orientation features configured to orient the first housing portion relative to the second housing portion when attached together in the closed position. The comb assembly can include a plurality of clips configured to connect the first housing portion to the second housing portion. In certain embodiments, the one or more orientation features can include the plurality clips such that the clips have different sizes such that the first housing portion and the second housing portion connect together in a predetermined orientation.

In certain embodiments, the plurality of clips can include arrow clips and corresponding clip apertures configured to receive the arrow clips. Any suitable clip type is contemplated herein. The clip apertures can be integrally formed with the first housing portion, and the arrow clips can be integrally formed with the second housing portion. It is contemplated that the clips and clip apertures can be associated with either the first housing portion or the second housing portion.

In certain embodiments, the arrow clips can be outer facing arrow clips. In certain embodiments, the arrow clips can be inner facing arrow clips.

In certain embodiments, the one or more orientation features can include one or more rabbet protrusions on the first housing portion or and/or second housing portion, and one or more corresponding rabbet recesses on the other of the first housing portion and/or the second housing portion that are configured to receive the one or more rabbet protrusions. The one or more rabbet protrusions and/or rabbet recesses can include a plurality of rabbet protrusions and rabbet recesses. At least two of the plurality of rabbet protrusions can have different sizes and be positioned to require the first housing portion and the second housing portion to attach together in a predetermined orientation.

In certain embodiments, the first indicia and the second indicia can be relatively configured to cause straightening of the wires for input into the second device. In certain embodiments, the first indicia and second indicia can be sticker labels.

In accordance with at least one aspect of this disclosure, a device conversion kit for replacing a first electrical device having a plurality of wires connected thereto can include a second electrical device having a plurality of wire terminals configured to be connected to the plurality of wires of the first device. The kit can also include a wire comb as disclosed herein, e.g., as described above (e.g., wherein the first indicia include indicia associated with the first device, and the second indicia include indicia associated with the second device).

In accordance with at least one aspect of this disclosure, a method can include organizing a plurality of wires within a wire comb in accordance with first indicia on an interior surface of the wire comb, the first indicia associated with wire position and/or terminal nomenclature in a first device, closing the wire comb over the plurality of wires to retain the plurality of wires in a relative position to each other, removing the plurality of wires from the first device while the plurality of wires are held in the wire comb, and installing the plurality of wires into a second device in accordance with second indicia on an outer surface of the wire comb while the plurality of wires are held in the wire comb, the second indicia associated with wire position and/or terminal nomenclature in the second device. In certain embodiments, the method can also include removing the wire comb after installing the plurality of wires into the second device.

In accordance with at least one aspect of this disclosure, a wire comb can include a first housing portion defining a rim structure extending away from an interior surface. The rim structure can include comb teeth configured to receive a wire or the plurality of wires between adjacent teeth. The rim structure can form side walls of the first housing portion such that the first housing portion forms a tray shape having an interior surface. The wire comb can include a second housing portion configured to assemble with the first housing portion. The wire comb can be or include any other suitable wire comb disclosed herein, e.g., as described above. The wire comb can have any other suitable structure disclosed herein, e.g., as described above (e.g., without indicia).

In accordance with at least one aspect of this disclosure, a wire comb for enabling faster wire exchange when migrating a plurality of electrical wires from at least one first device (e.g., device(s) being migrated from) to at least one second device (e.g., device(s) being migrated to) can include an upper portion (e.g., a second housing portion as disclosed herein) having an outer surface and an inner surface, the outer surface of the upper portion having an outer label with terminal position text associated with the plurality of electrical wires for the at least one second device (e.g., device(s) being migrated to), and the inner surface of the upper portion having a compression cushion disposed thereover. The wire comb can include a lower portion (e.g., a first housing portion as disclosed herein) having an outer surface and an inner surface, the inner surface of the lower portion having an inner label with terminal position text associated with the plurality of electrical wires for the at least one first device. The inner surface of the lower portion can also having a plurality of cavities formed therein, the plurality of cavities extending a predetermined depth from the inner surface to the outer surface of the lower portion and extending between first and second opposing sides of the lower portion, each of the plurality of cavities shaped to receive a respective electrical wire of the plurality of electrical wires, with the plurality of electrical wires capable of passing through the first and second opposing sides of the lower portion through the plurality of cavities. The upper portion of the wire comb can be configured to be removably coupled from the lower portion of the wire comb using at least one fastening means, and the compression cushion can be configured to exert a force on the plurality electrical wires to reduce or eliminate movement of the plurality of electrical wires in the wire comb when the plurality of wires are received in the plurality of cavities and the upper portion of the wire comb is coupled to the lower portion of the wire comb.

The at least one fastening means can include at least one fastening mechanism integrated into at least one of the upper portion and the lower portion. The at least one fastening mechanism can include at least one snap latch. In certain embodiments, the at least one fastening mechanism can include at least one hinge.

The plurality of cavities can be configured to accommodate wires of various gauges. The wire comb can be molded or printed. The outer label can be printed, etched, or molded on the outer surface of the upper portion. The inner label can be printed or etched on the inner surface of the lower portion. In certain embodiments, at least one aspect of the terminal position text associated with the plurality of electrical wires for the at least one second device can be different from the terminal position text associated with the plurality of electrical wires for the at least one first device.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
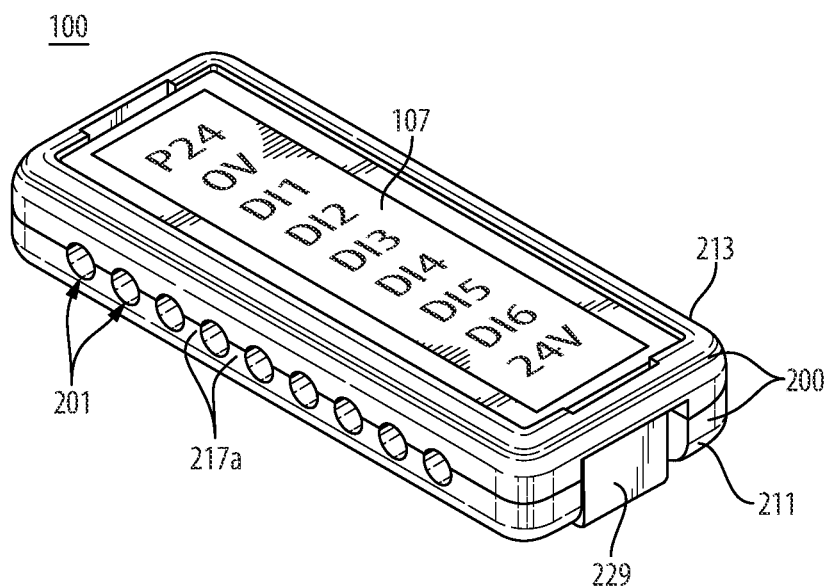
FIG. 1A is a perspective view of an embodiment of a wire comb in accordance with this disclosure, shown assembled.
Figure 1B:
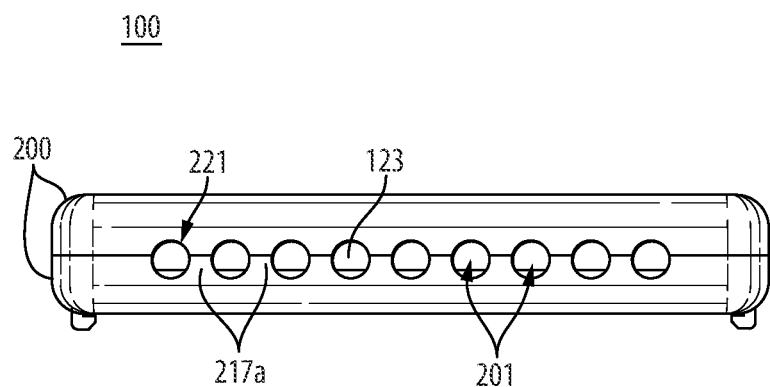
FIG. 1B is a side elevation view of the embodiment of FIG. 1A.
Figure 1C:
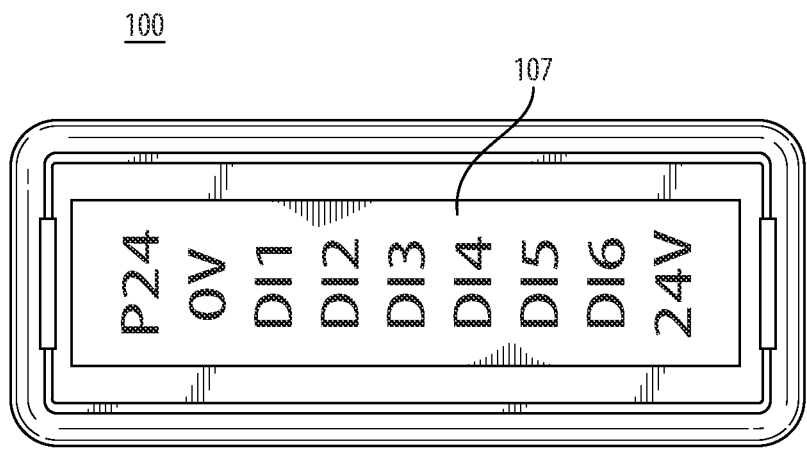
FIG. 1C is a plan view of the embodiment of FIG. 1A.
Figure 1D:
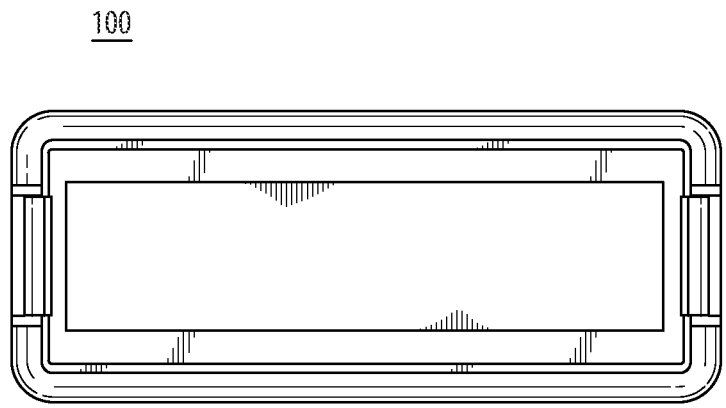
FIG. 1D is a reverse plan view of the embodiment of FIG. 1C.

Reference will now be made to the drawings wherein like reference numerals identify similar structural features or aspects of the subject disclosure. For purposes of explanation and illustration, and not limitation, an illustrative view of an embodiment of a wire comb in accordance with the disclosure is shown in FIGS. 1A and 1s designated generally by reference character 100. Other embodiments and/or aspects of this disclosure are shown in FIGS. 1B-15H.

Referring to FIGS. 1A-8C, a wire comb 100, 500 can include a comb assembly 200, 600. The comb assembly 200, 600 can define a plurality of openings 201, 601 configured to organize and retain a plurality of wires (e.g., wires 99 as shown in FIGS. 11A-15H) associated with a first device (e.g., a device 1197, 1297, 1307, 1597 as shown in FIGS. 11E, 12E, 13D, 15E that the wires are attached to and being migrated from). The comb assembly 200, 600 can be configured to allow insertion and organization of the plurality of wires 97 in an open state (e.g., as shown in FIGS. 2A and 6A), and to retain the plurality of wires 97 in a relative position in a closed state (e.g., as shown in FIGS. 1A and 5A).

Figure 1E:
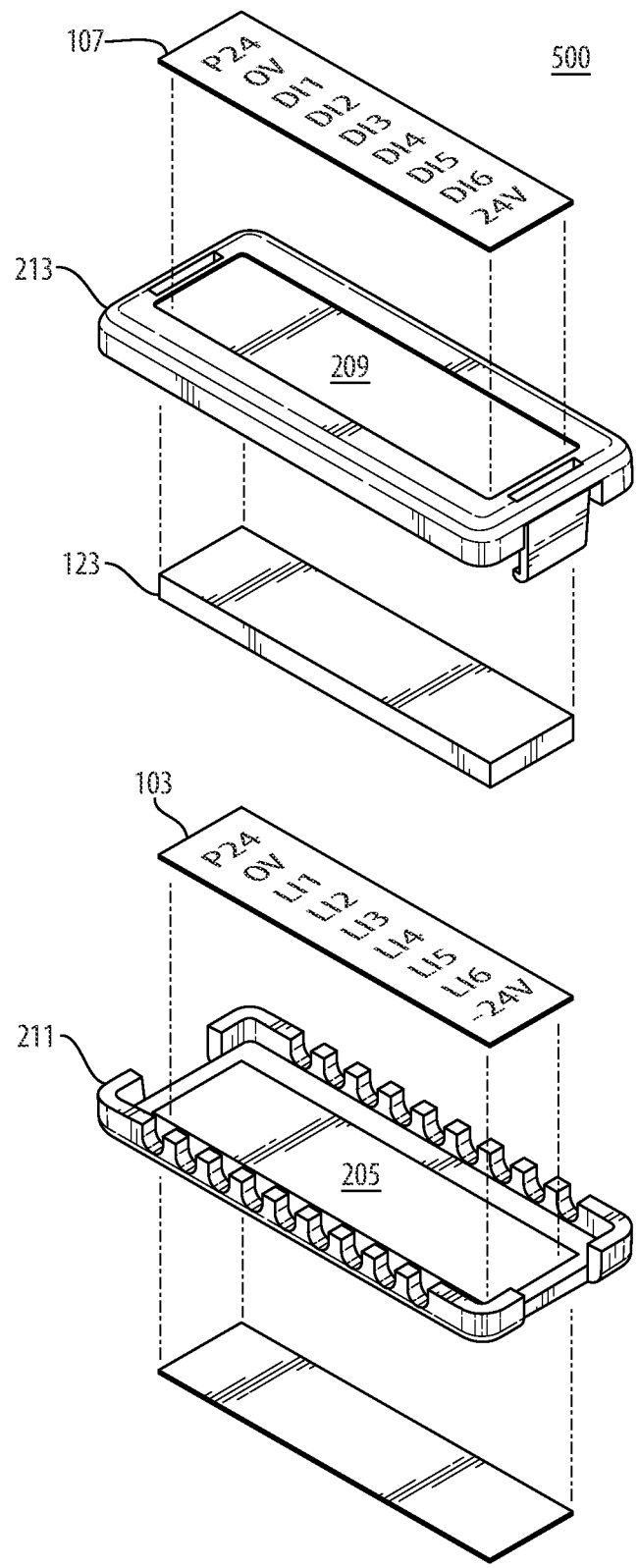
FIG. 1E is an exploded view of the embodiment of FIG. 1A.
Figure 2A:
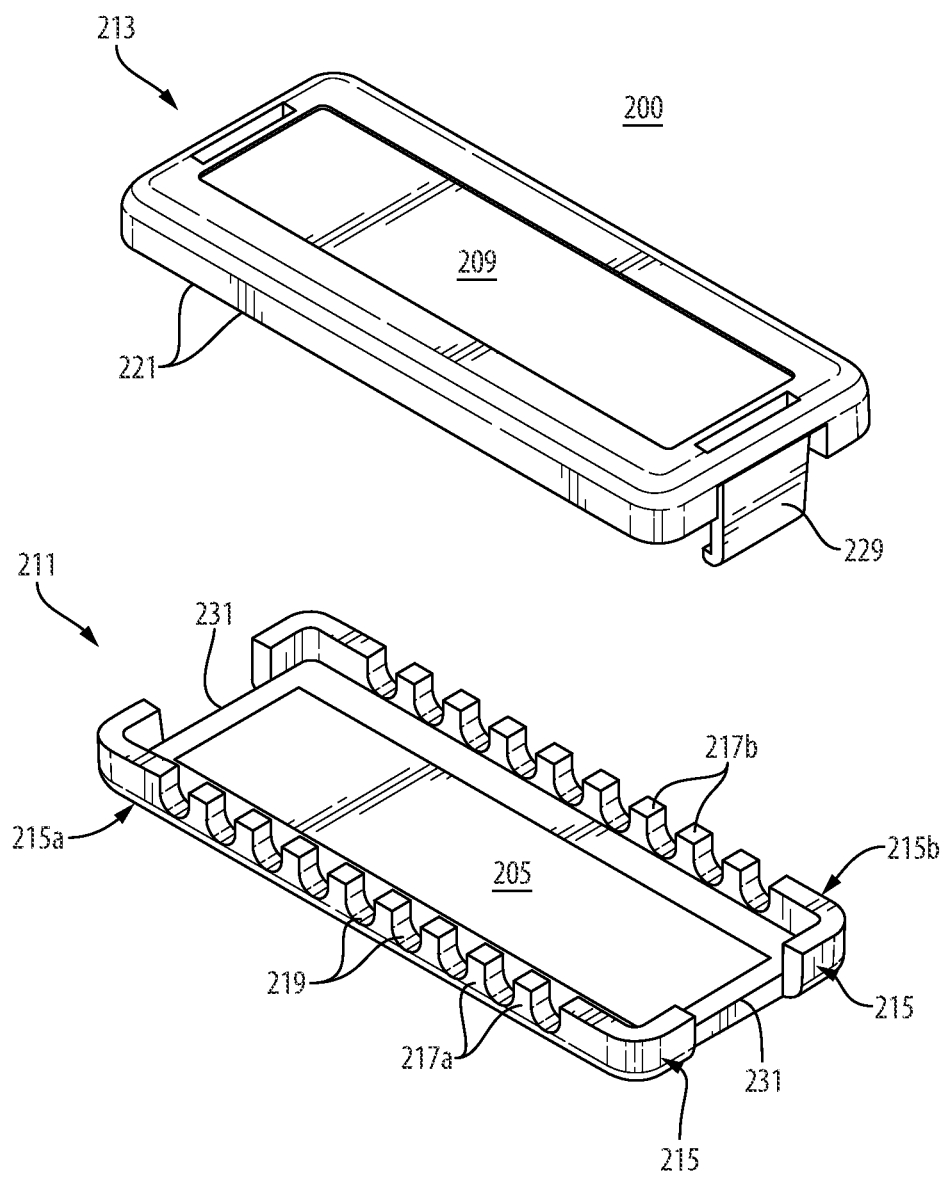
FIG. 2A is an exploded view of a comb assembly of the embodiment of a wire comb FIG. 1A.
Figure 2B:
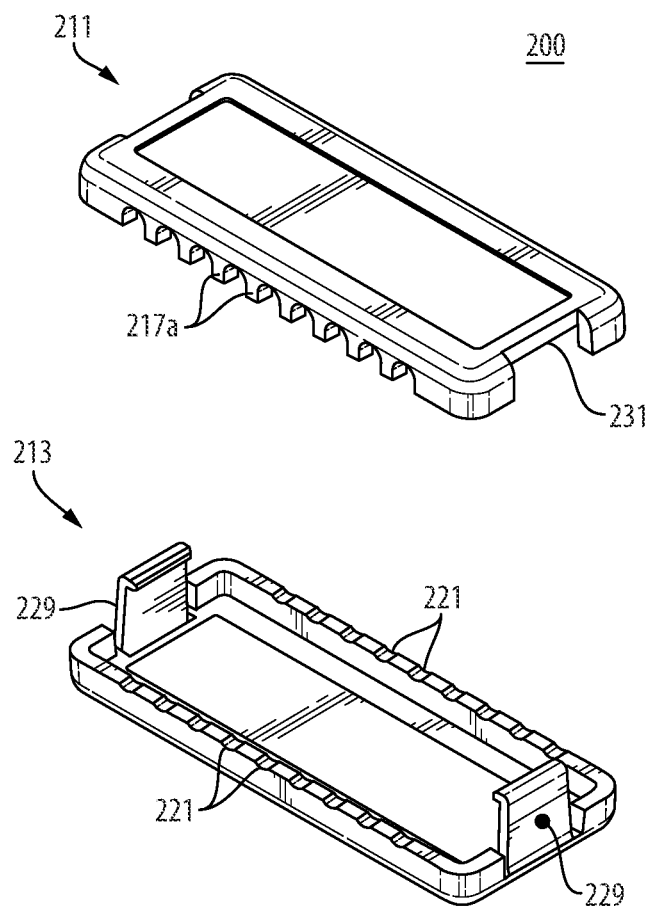
FIG. 2B is a reverse exploded view of the comb assembly as shown in FIG. 2A.
Figure 3A:
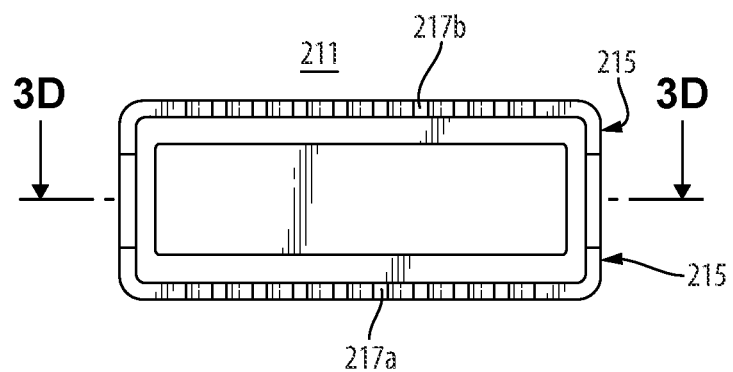
FIG. 3A is a plan view of a first housing portion of the embodiment of a comb assembly of FIG. 2A.
Figure 3B:
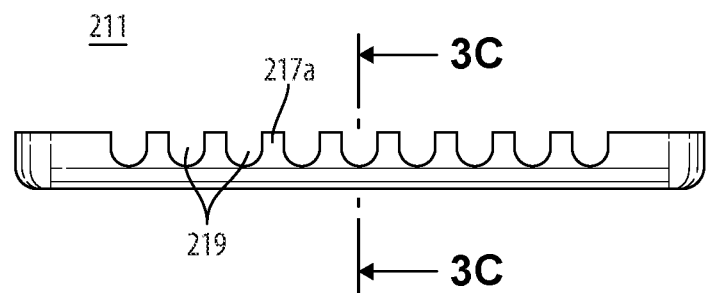
FIG. 3B is an elevation view of the first housing portion of FIG. 3A.
Figure 3C:
FIG. 3C is a cross-sectional view of the first housing portion of FIG. 3A.
Figure 3D:
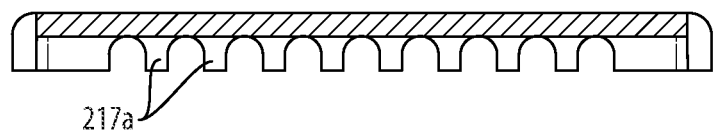
FIG. 3D is a cross-sectional view of the embodiment of the first housing portion of FIG. 3A.
Figure 4A:
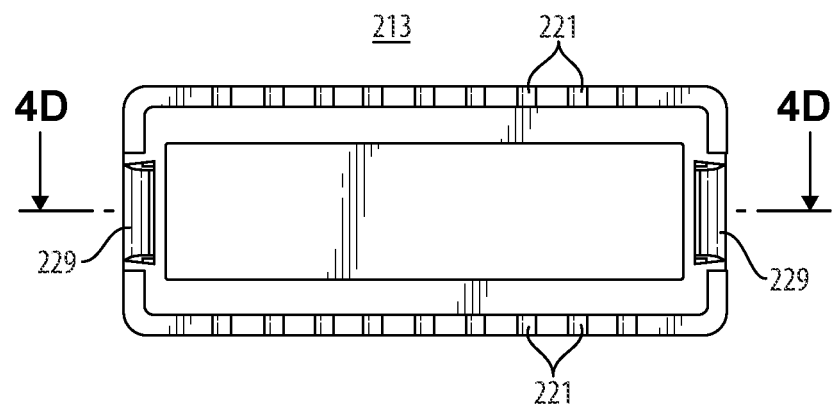
FIG. 4A is a plan view of a second housing portion of the embodiment of a comb assembly of FIG. 2A.
Figure 4B:
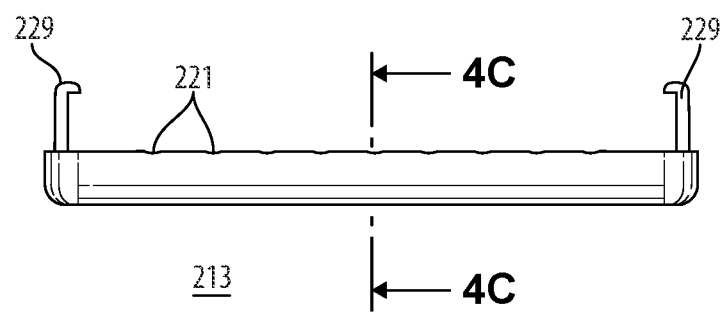
FIG. 4B is an elevation view of the second housing portion of FIG. 4A.
Figure 4C:
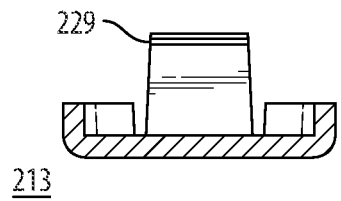
FIG. 4C is a cross-sectional view of the second housing portion of FIG. 4A.
Figure 4D:
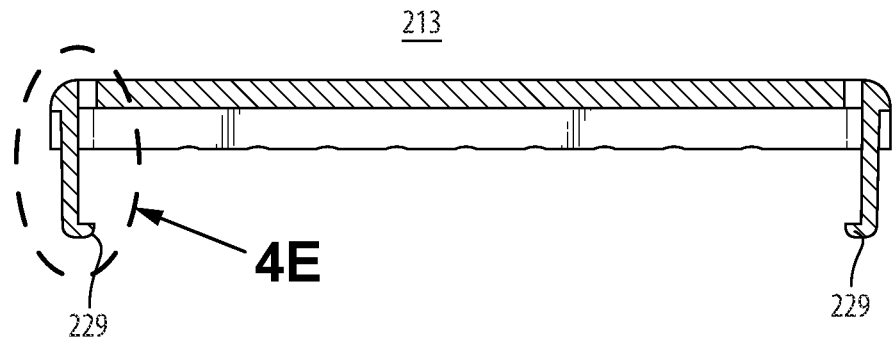
FIG. 4D is a cross-sectional view of the embodiment of the second housing portion of FIG. 3A.
Figure 4E:
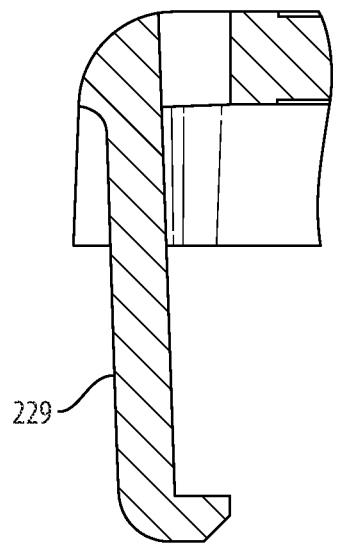
FIG. 4E is detail cross-sectional view of the embodiment of the second housing portion as shown in FIG. 4A.
Figure 5A:
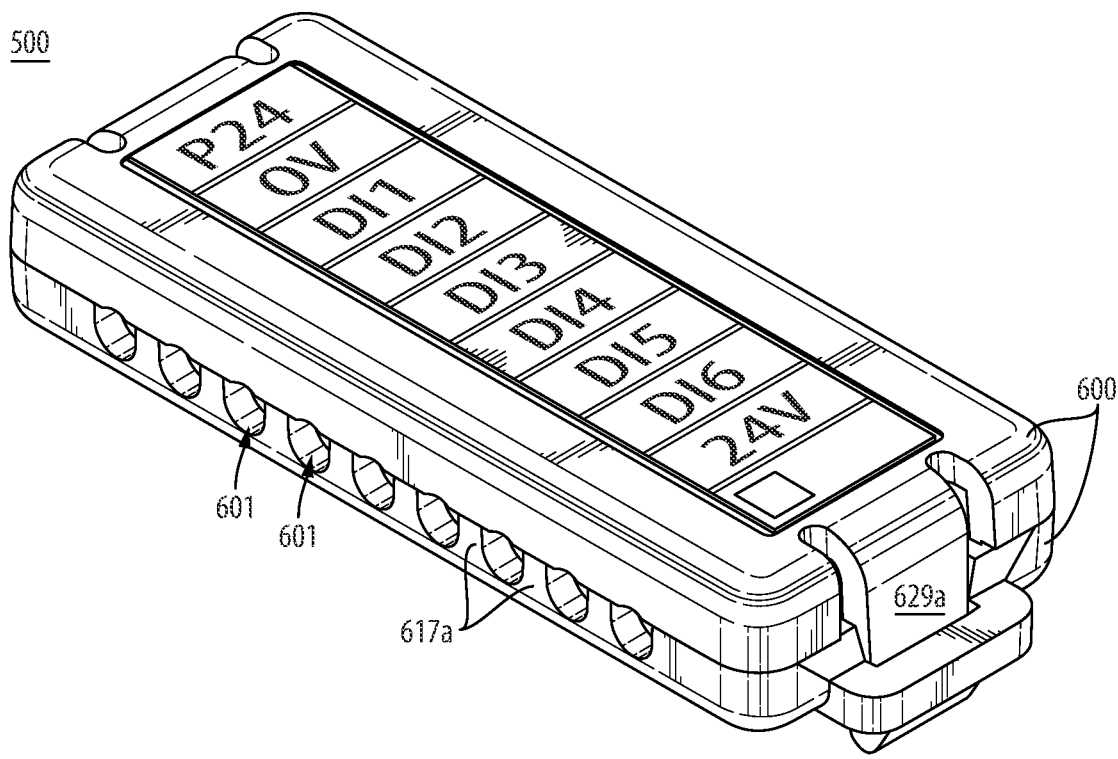
FIG. 5A is a perspective view of another embodiment of a wire comb in accordance with this disclosure, shown assembled.
Figure 5B:
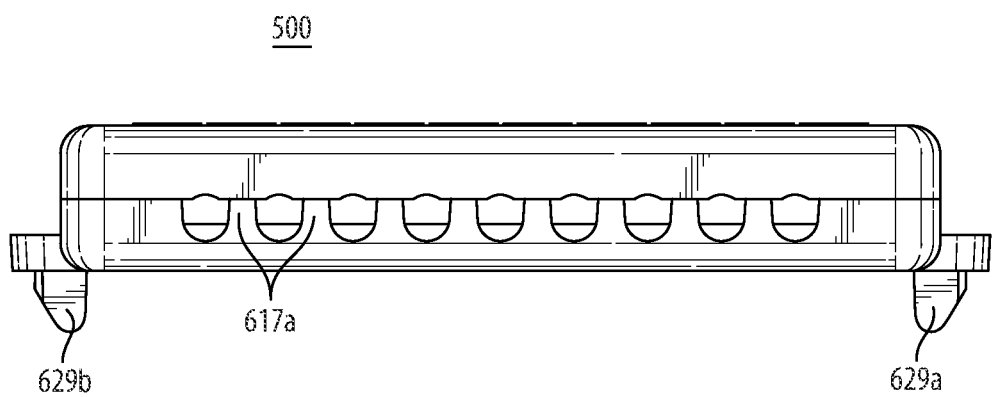
FIG. 5B is a side elevation view of the embodiment of FIG. 5A.
Figure 5C:
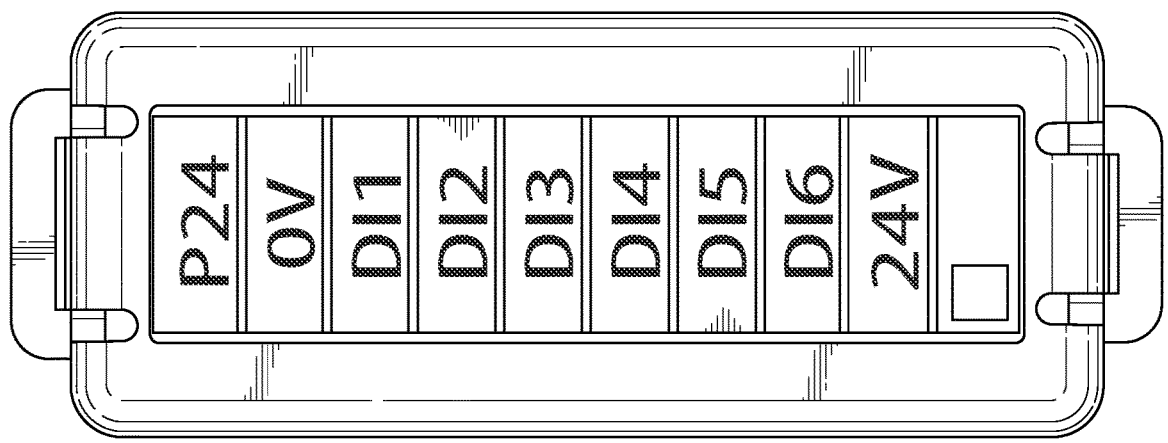
FIG. 5C is a plan view of the embodiment of FIG. 5A.
Figure 5D:
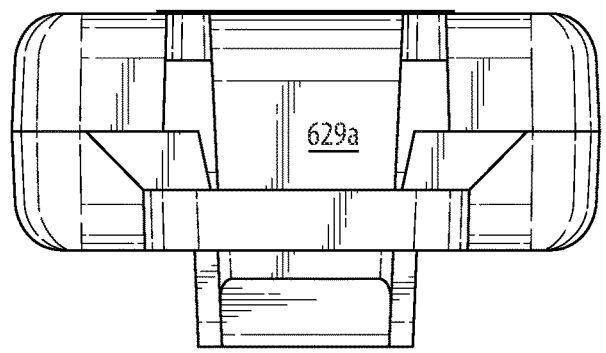
FIG. 5D is a side elevation view of the embodiment of FIG. 5A.
Figure 5E:
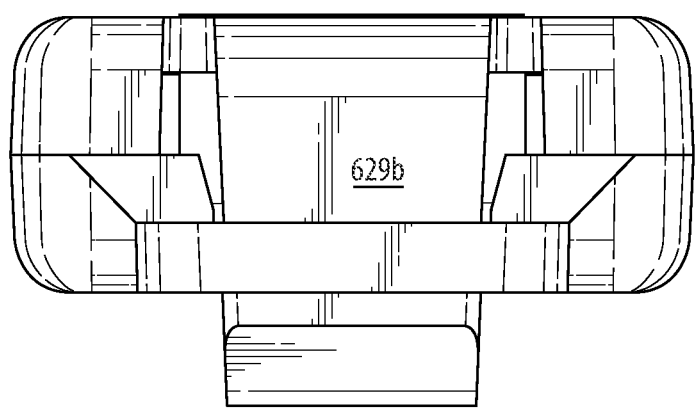
FIG. 5E is a reverse side elevation view of the embodiment of FIG. 5D.
Figure 5F:
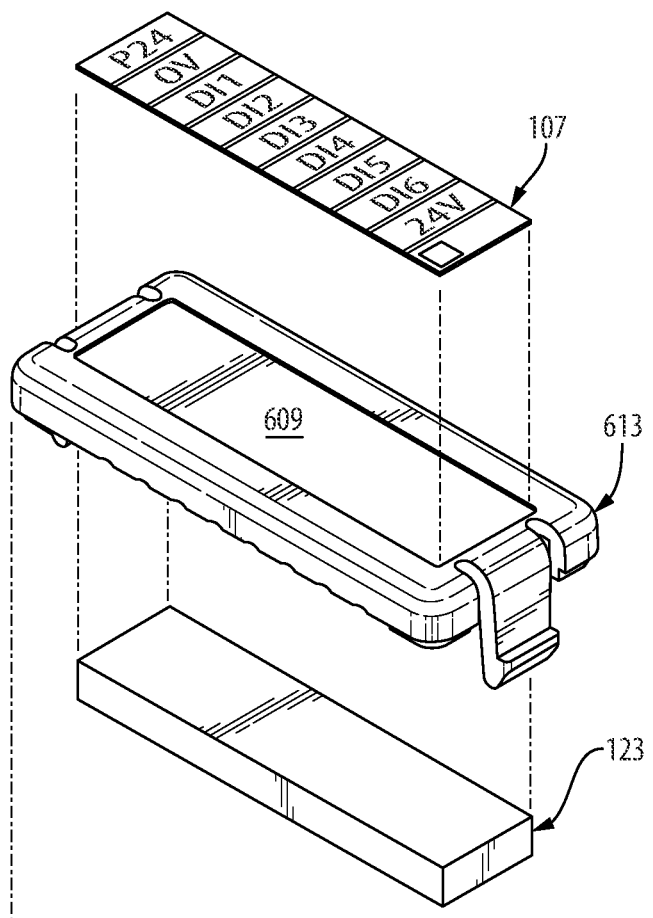
FIG. 5F is an exploded view of the embodiment of FIG. 5A.
Figure 5F:
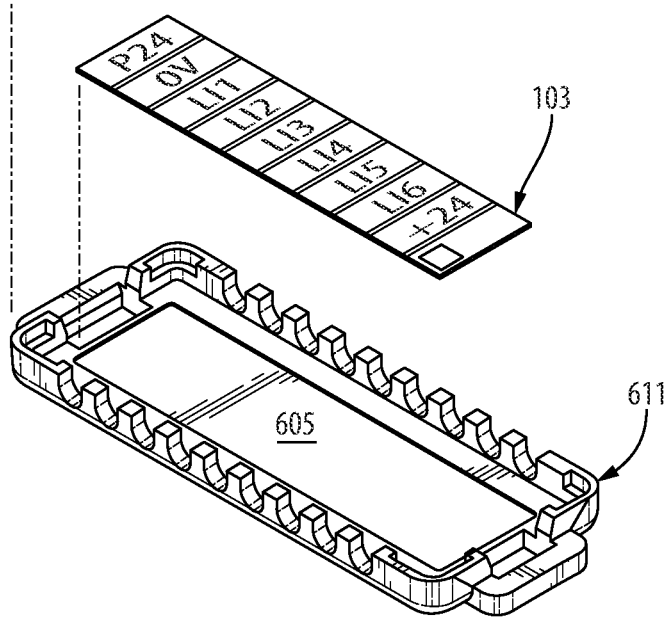
Figure 6A:
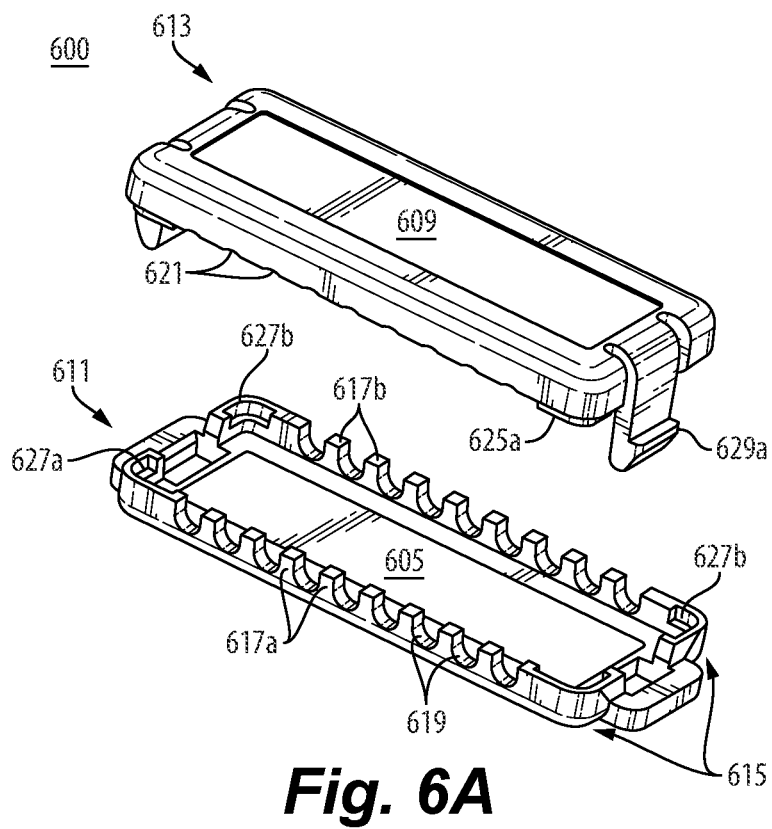
FIG. 6A is an exploded view of a comb assembly of the embodiment of a wire comb FIG. 5A.
Figure 6B:
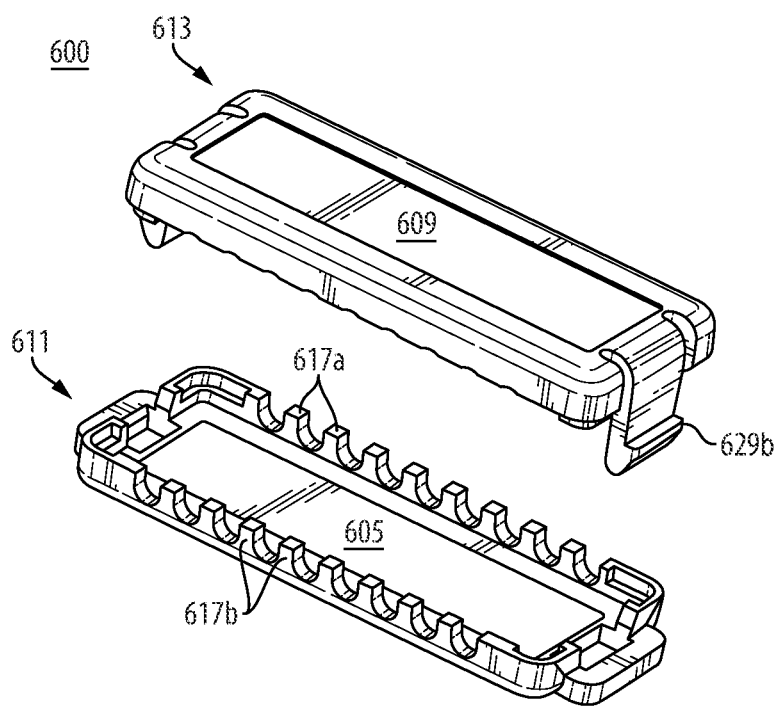
FIG. 6B is a reverse exploded view of the comb assembly as shown in FIG. 6A.
Figure 6C:
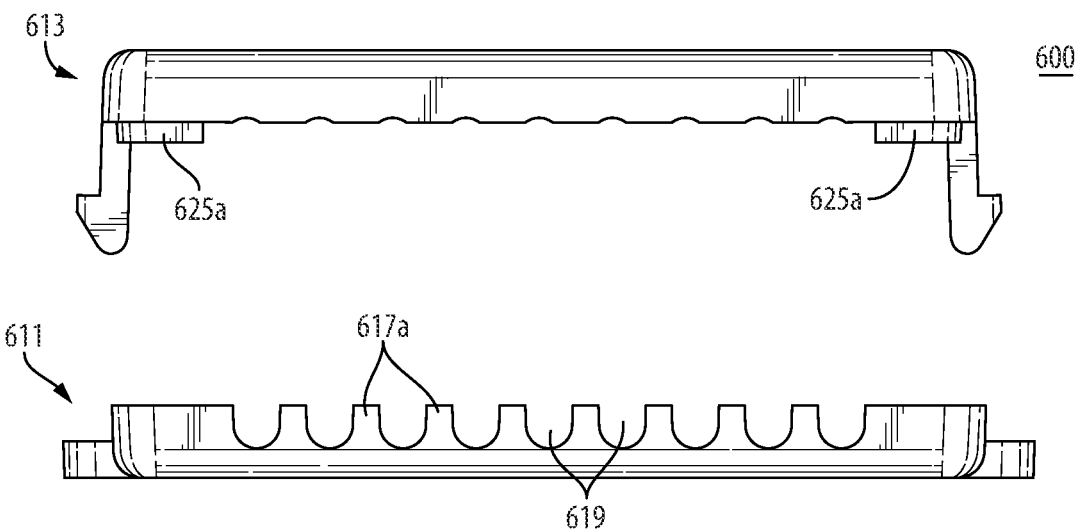
FIG. 6C is a side exploded view of the comb assembly as shown in FIG. 6A.
Figure 7A:
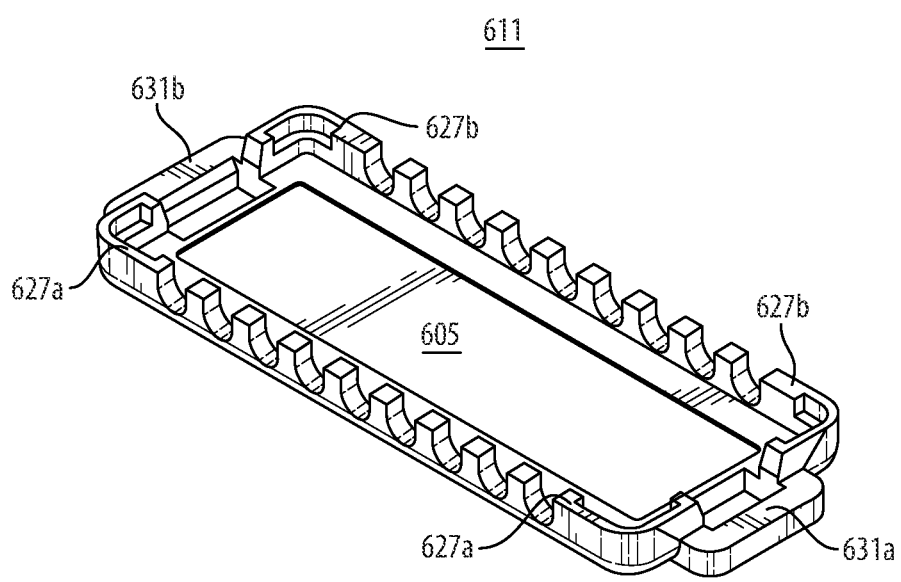
FIG. 7A is a perspective view of a first housing portion of the embodiment of a comb assembly of FIG. 6A.
Figure 7B:
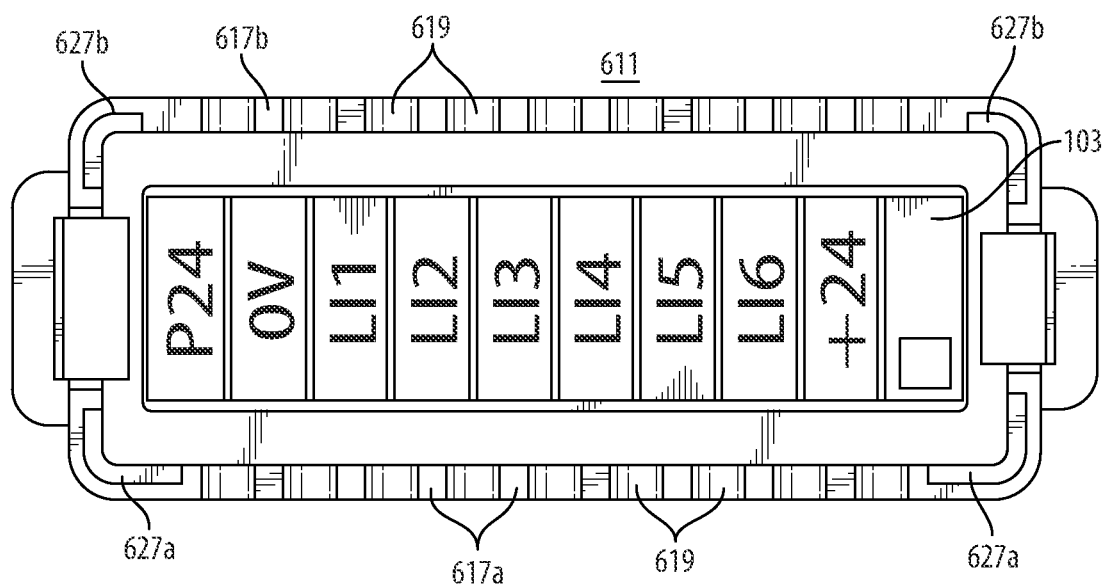
FIG. 7B is a plan view of the first housing portion of FIG. 6A.
Figure 8A:
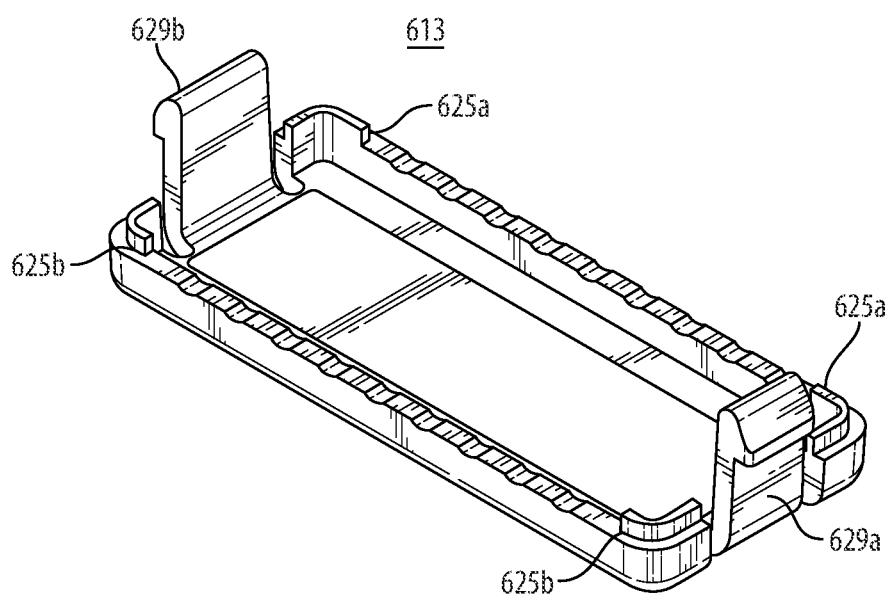
FIG. 8A is a perspective view of a second housing portion of the embodiment of a comb assembly of FIG. 6A.
Figure 8B:
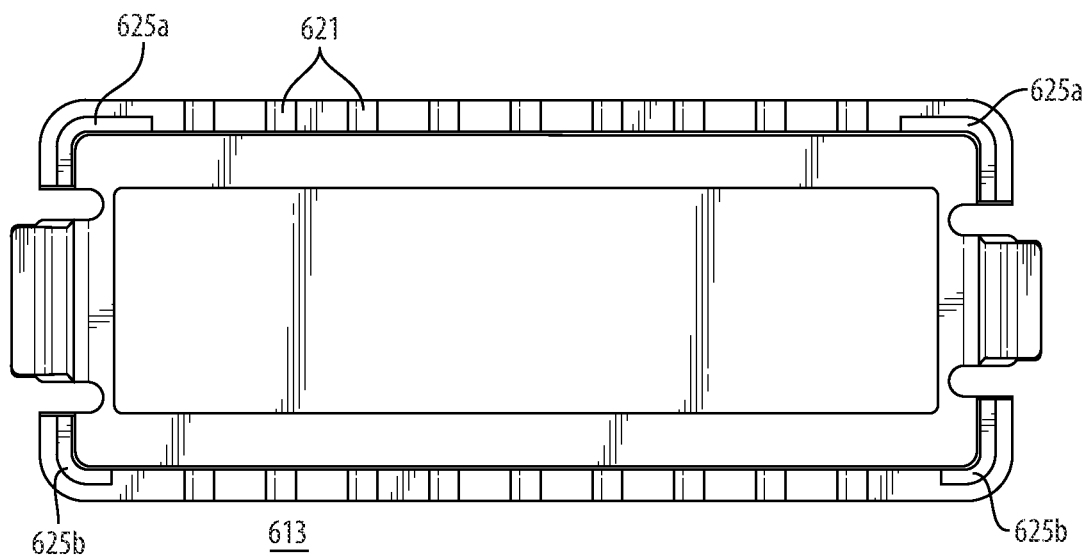
FIG. 8B is a plan view of the second housing portion of FIG. 6A.
Figure 8C:
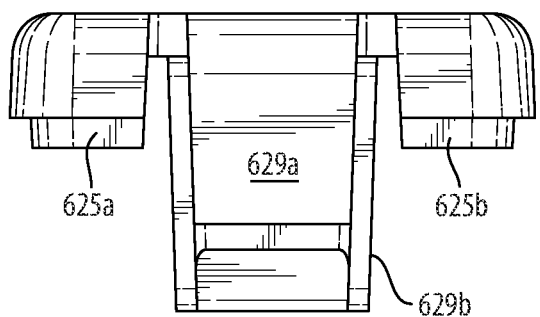
FIG. 8C is a side elevation view of the second housing portion of FIG. 6A.

As shown in FIGS. 1E and 5F, the wire comb 100, 500 can include first indicia 103 (e.g., one or more markings, labels, etchings, raised structure) disposed within the comb assembly 200 on an interior surface 205, 605 of at least a portion of the comb assembly 200, 600. The first indicia 103 can be positioned to underlay the plurality of wires 97 to allow the wires to be organized over the first indicia 103 in accordance with the first indicia 103 in the open state. The wire comb 100, 500 can include second indicia 107 disposed on an outer surface 209, 609 of the comb assembly 200, 600. The second indicia 107 can be positioned to correspond to the plurality of wires 97 retained within the comb assembly 200, 600 to allow the wires 97 to be installed into terminals of a second device (e.g., a device 1195, 1295, 1395, 1495, 1595 as shown in FIGS. 11G, 12G, 13F, 14E, and 15G to which the wires 97 are being migrated) in accordance with the second indicia 107.

The first indicia 103 can be different than the second indicia 107 (e.g., where the first device has a different terminal arrangement and/or nomenclature than the second device). In certain embodiments, the first indicia 103 can be the same as the second indicia 107 (e.g., where the terminals and nomenclature for the second device are the same as the first device).

In certain embodiments, the position of the wires 97 in the first indicia 103 can be such that the plurality of wires 97 are organized to match the relative position as in the terminal arrangement of the first device (e.g., as shown in the embodiments of first indicia 103, 1303, 1503 of FIGS. 11A-15H). In such embodiments, e.g., as shown in the embodiments of FIGS. 12A-15H, the second indicia 1207, 1307, 1407, 1507 can include position instructions (e.g., one or more arrows as shown) for repositioning one or more wires of the plurality of wires 97 to a position that is the same or similar to the terminal arrangement of the second device.

Figure 10:
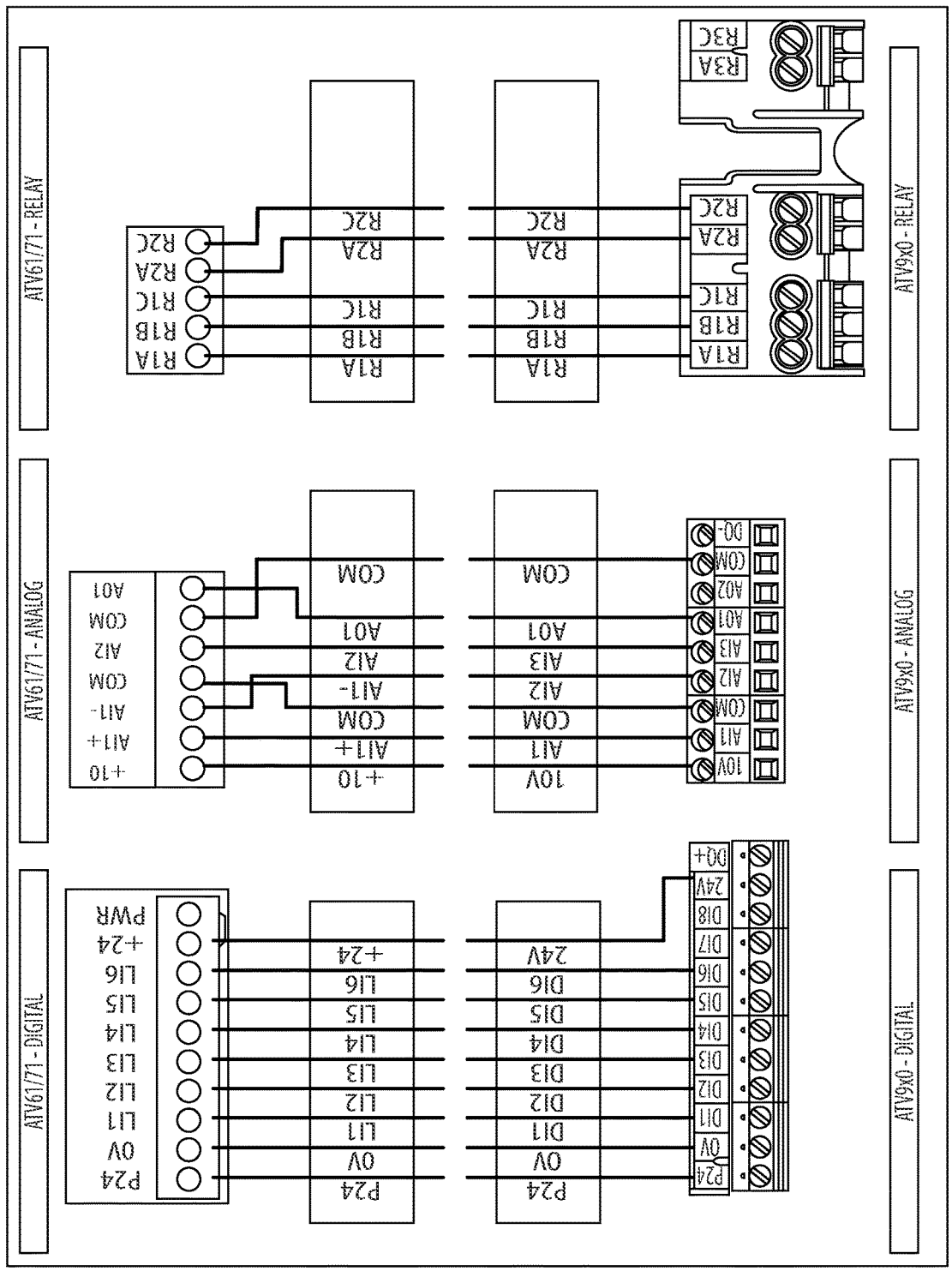
FIG. 10 is a schematic diagram showing the indicia of FIG. 9 being used to migrate wires from a first device to a second device.
Figure 10:
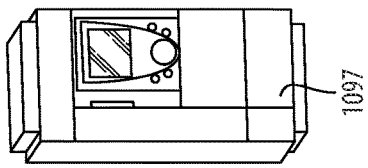
Figure 10:
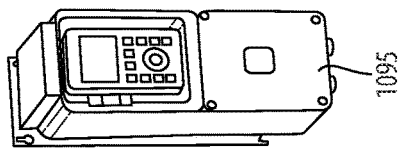
Figure 11A:
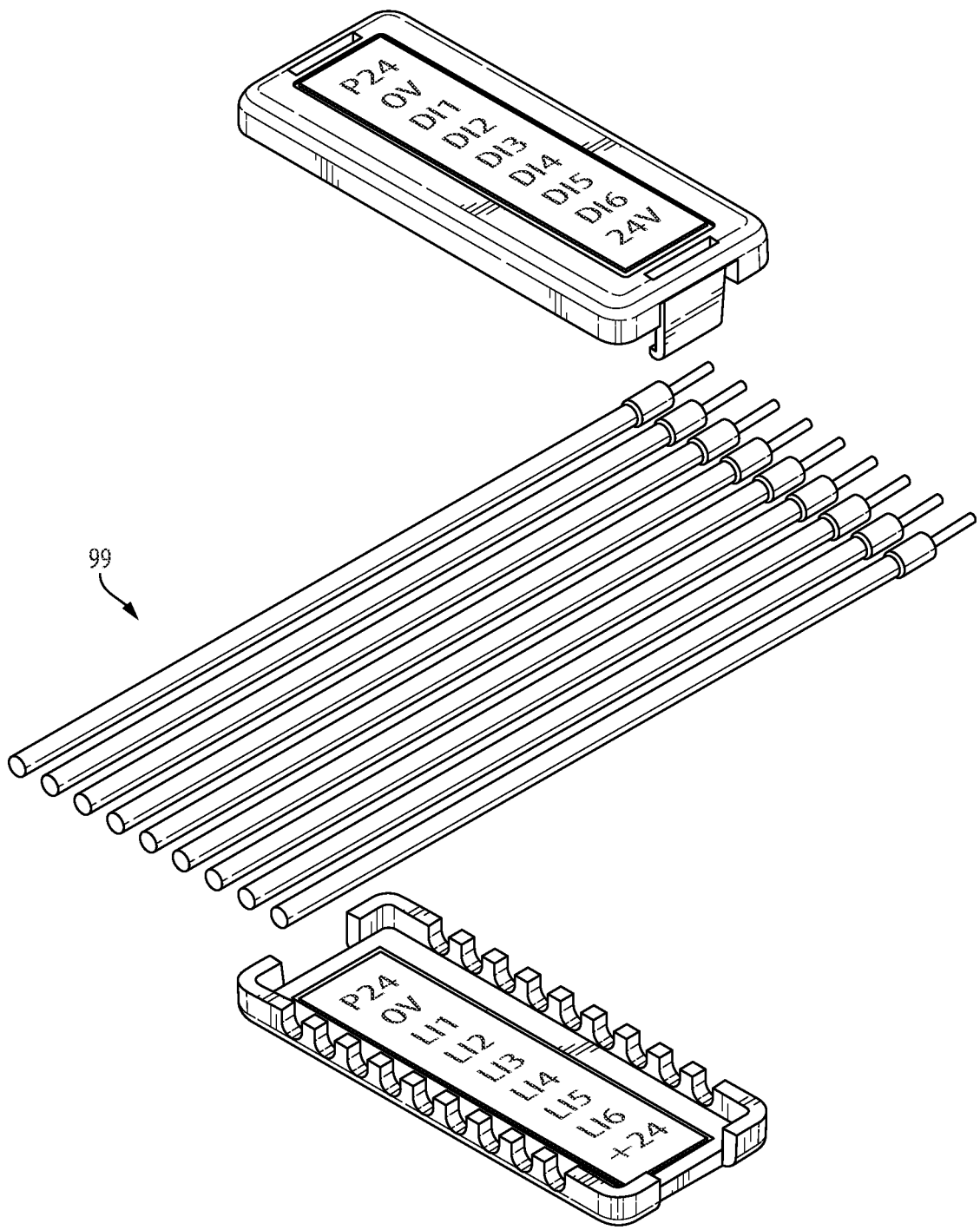
FIGS. 11A-11H illustrate an embodiment of a wire comb in accordance with this disclosure being installed over a plurality of wires (FIGS. 11A, 11B, 11C, and 11D) when the plurality of wires are connected to a first device (FIG. 11E), showing an embodiment of first indicia (FIG. 11F) on an inside of the comb assembly, and an embodiment of second device (FIG. 11G) and second indicia (FIG. 11H) on an outside of the comb assembly correlating to terminals of the second device, wherein all wires are shown in a same position as organized from the first device.
Figure 11B:
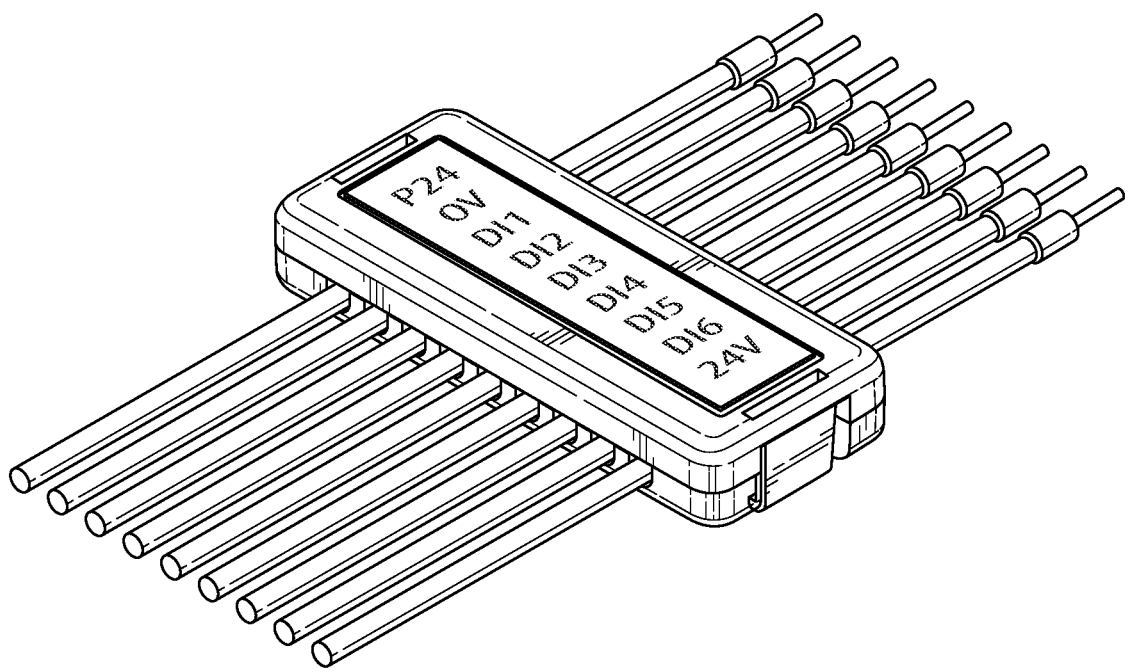
Figure 11C:
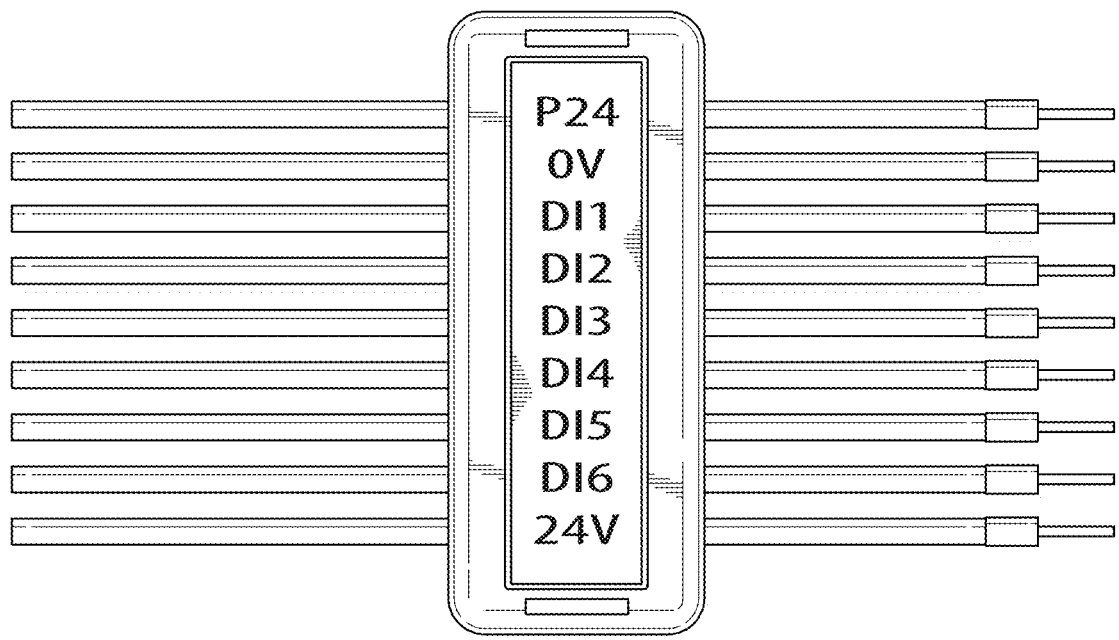
Figure 11D:
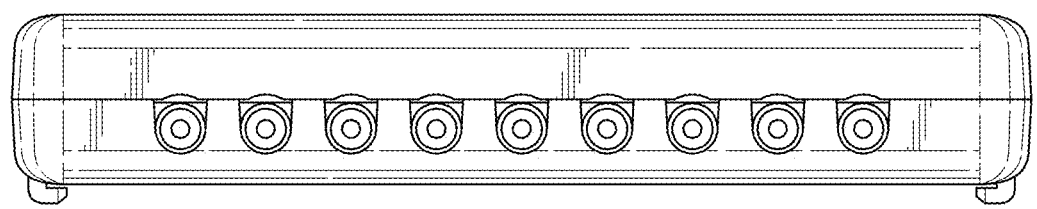
Figure 11E:
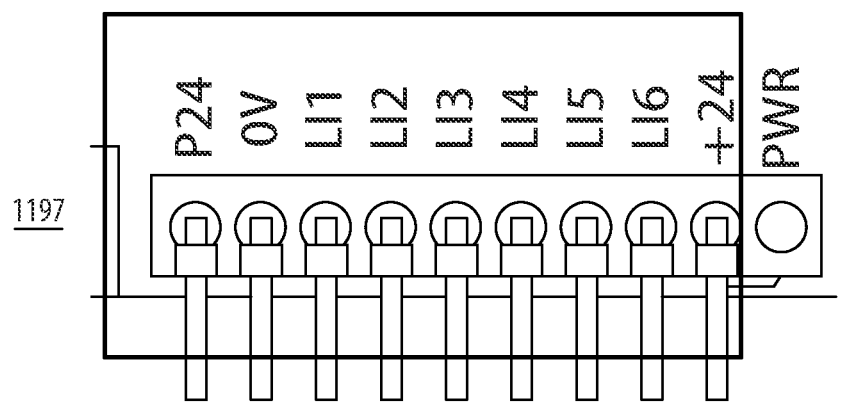
Figure 11F:
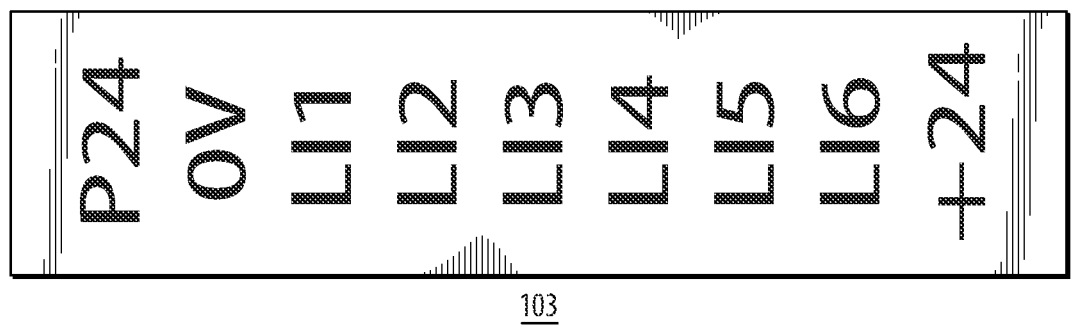
Figure 11G:
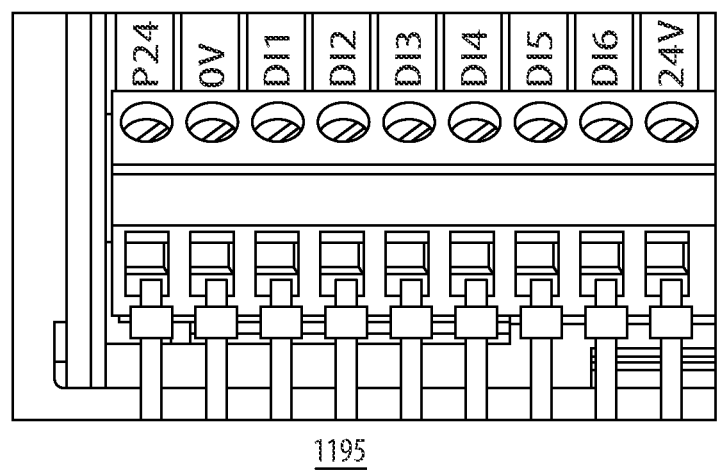
Figure 11H:
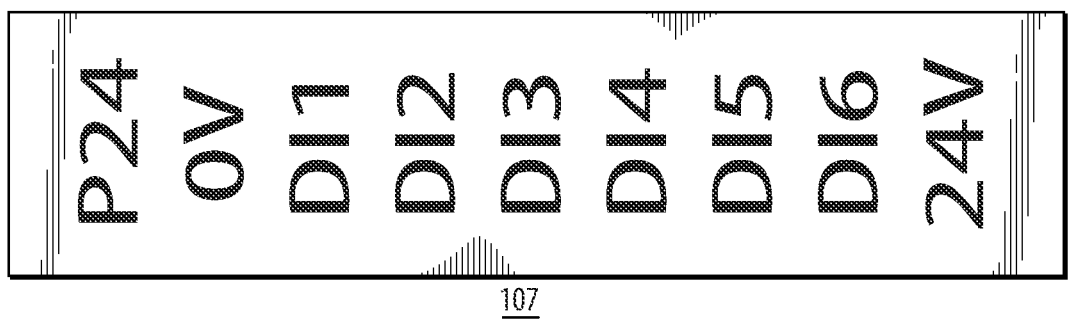
Figure 12A:
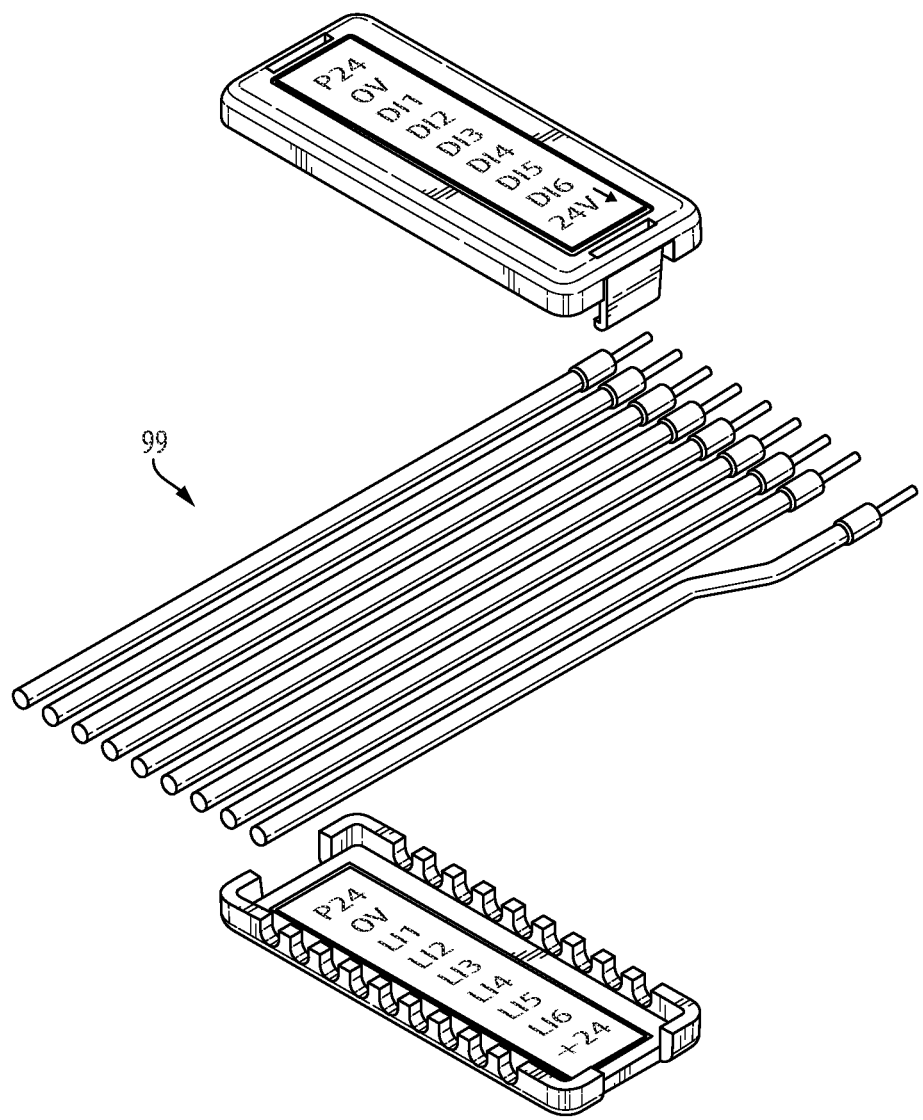
FIGS. 12A-12H illustrate an embodiment of a wire comb in accordance with this disclosure being installed over a plurality of wires (FIGS. 12A, 12B, 12C, and 12D) when the plurality of wires are connected to a first device (FIG. 12E), showing an embodiment of first indicia (FIG. 12F) on an inside of the comb assembly, and an embodiment of second device (FIG. 12G) and second indicia (FIG. 12H) on an outside of the comb assembly correlating to terminals of the second device, wherein the second device requires repositioning of at least one wire (already shown bent into position in FIGS. 12A-12D) for which the second indicia includes an arrow to indicate where to reposition the wire.
Figure 12B:
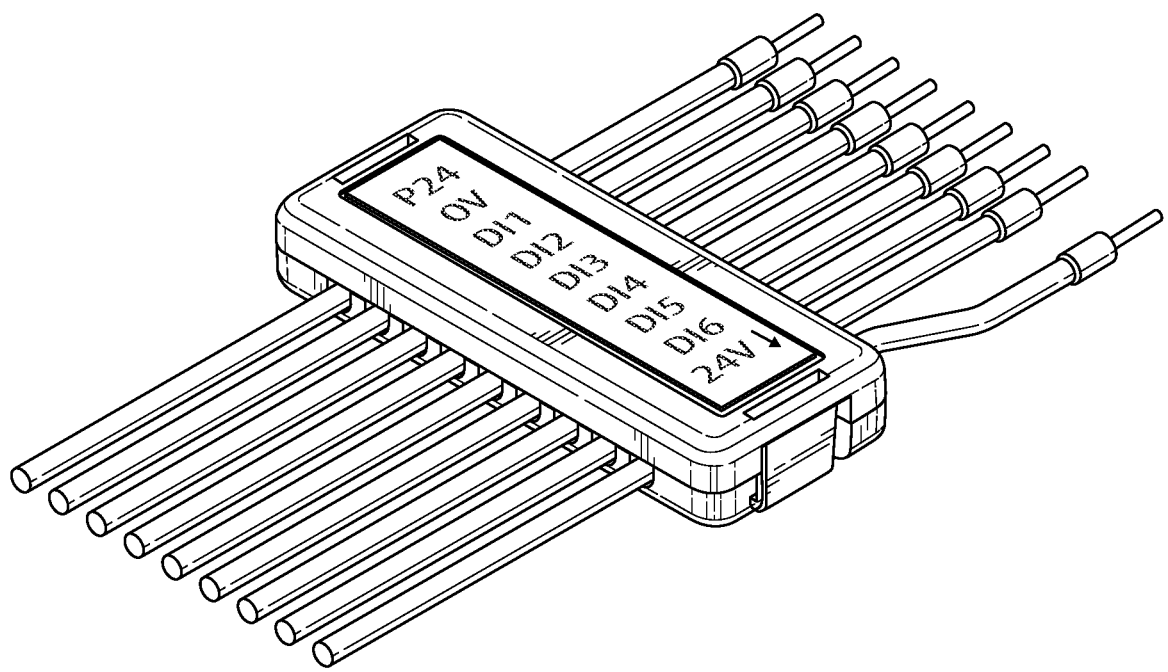
Figure 12C:
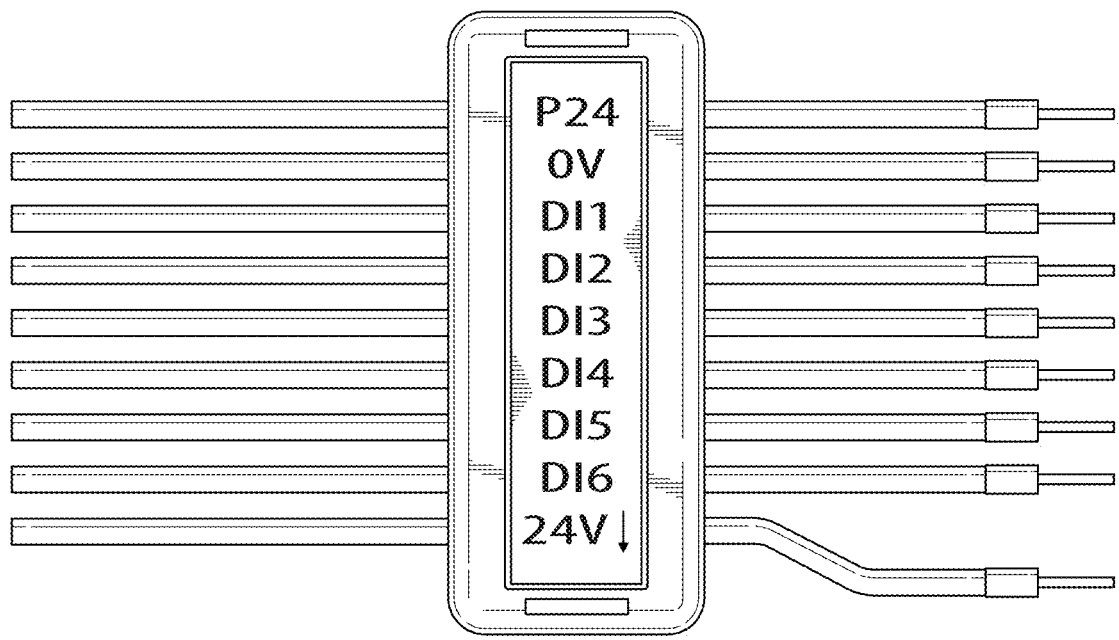
Figure 12D:
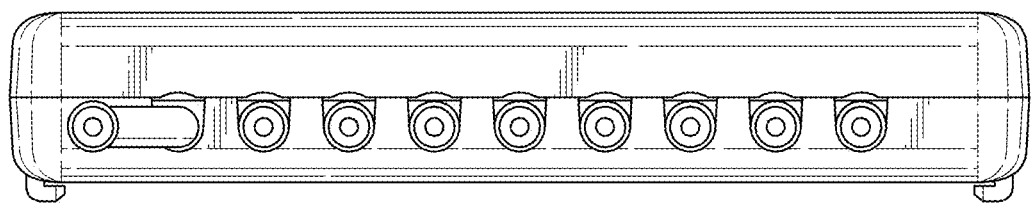
Figure 12E:
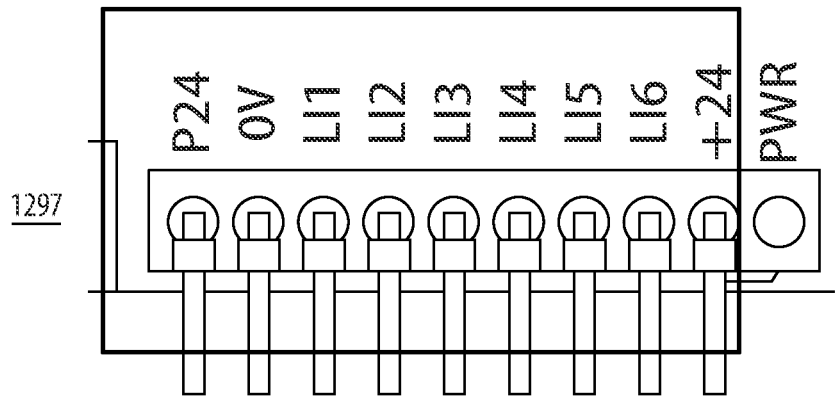
Figure 12F:
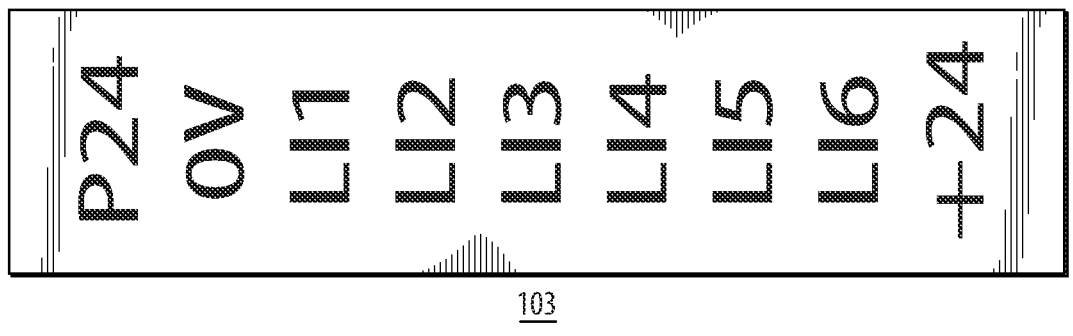
Figure 12G:
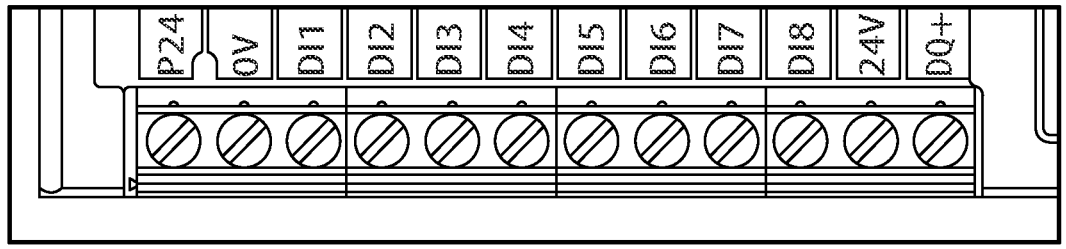
Figure 12H:
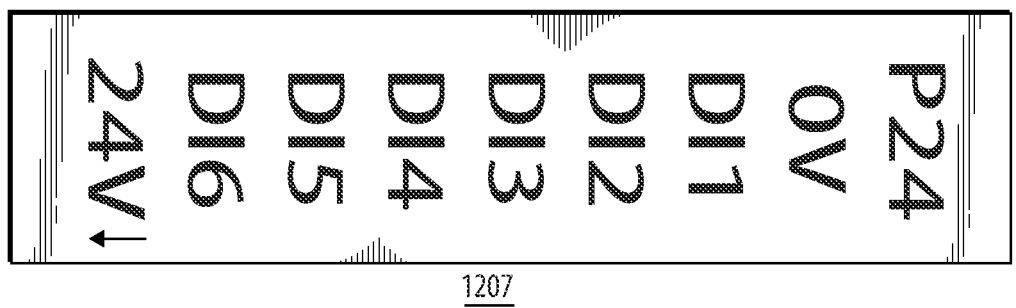
Figure 13A:
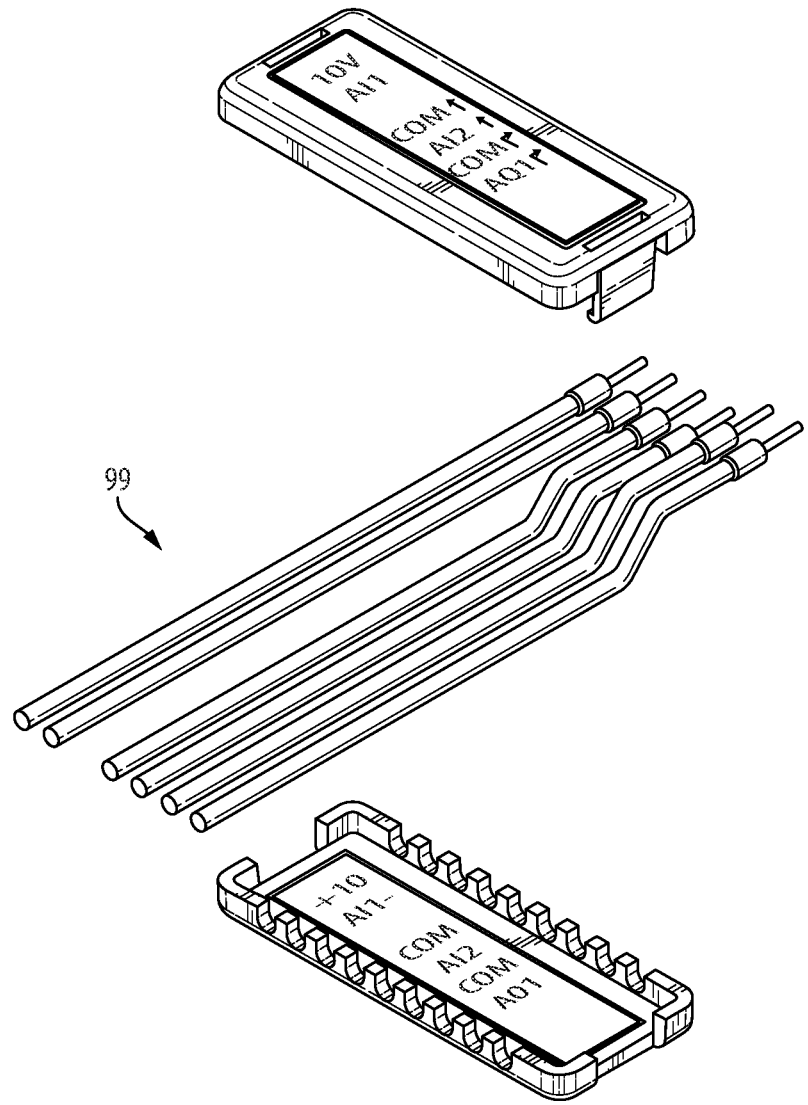
FIGS. 13A-13G illustrate an embodiment of a wire comb in accordance with this disclosure being installed over a plurality of wires (FIGS. 13A, 13B, and 13C) when the plurality of wires are connected to a first device (FIG. 13D), showing an embodiment of first indicia (FIG. 13E) on an inside of the comb assembly, and an embodiment of second device (FIG. 13F) and second indicia (FIG. 13G) on an outside of the comb assembly correlating to terminals of the second device, wherein the second device requires repositioning of at least one wire (already shown bent into position in FIGS. 12A-12D) for which the second indicia includes arrows to indicate where to reposition the wires.
Figure 13B:
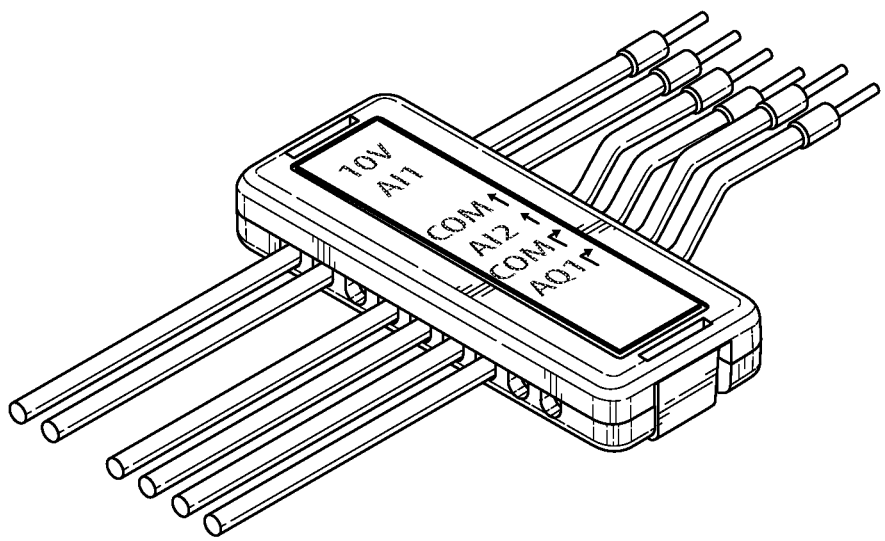
Figure 13C:
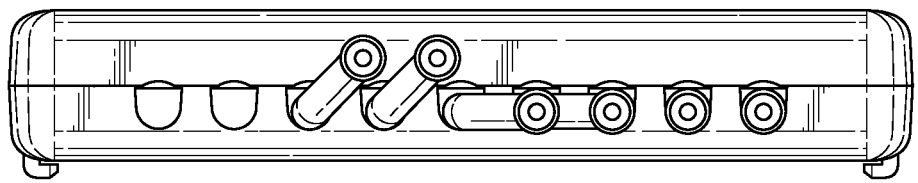
Figure 13D:
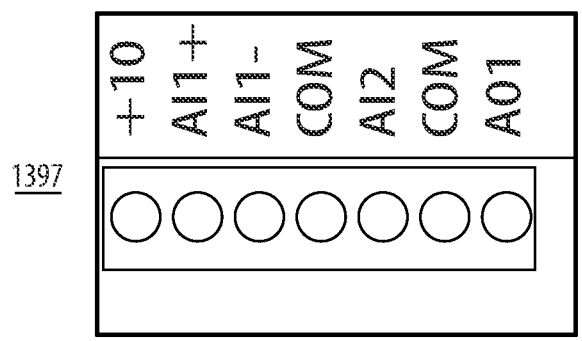
Figure 13E:
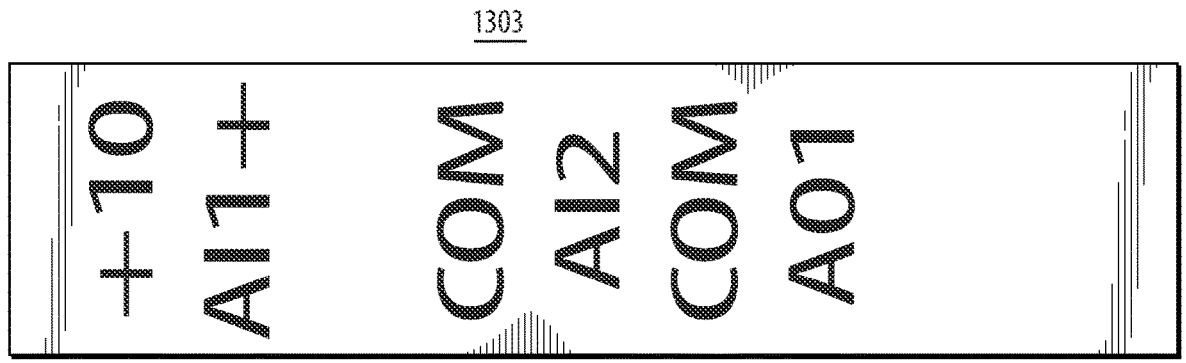
Figure 13F:
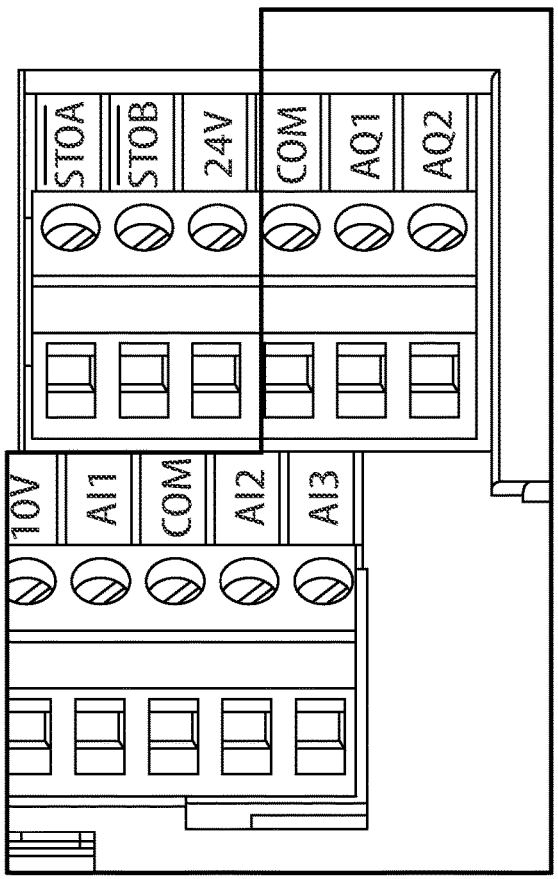
Figure 13G:
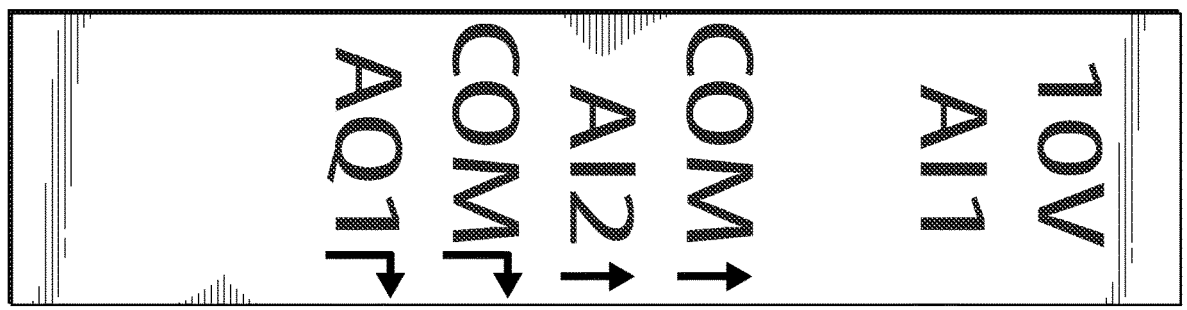
Figure 14A:
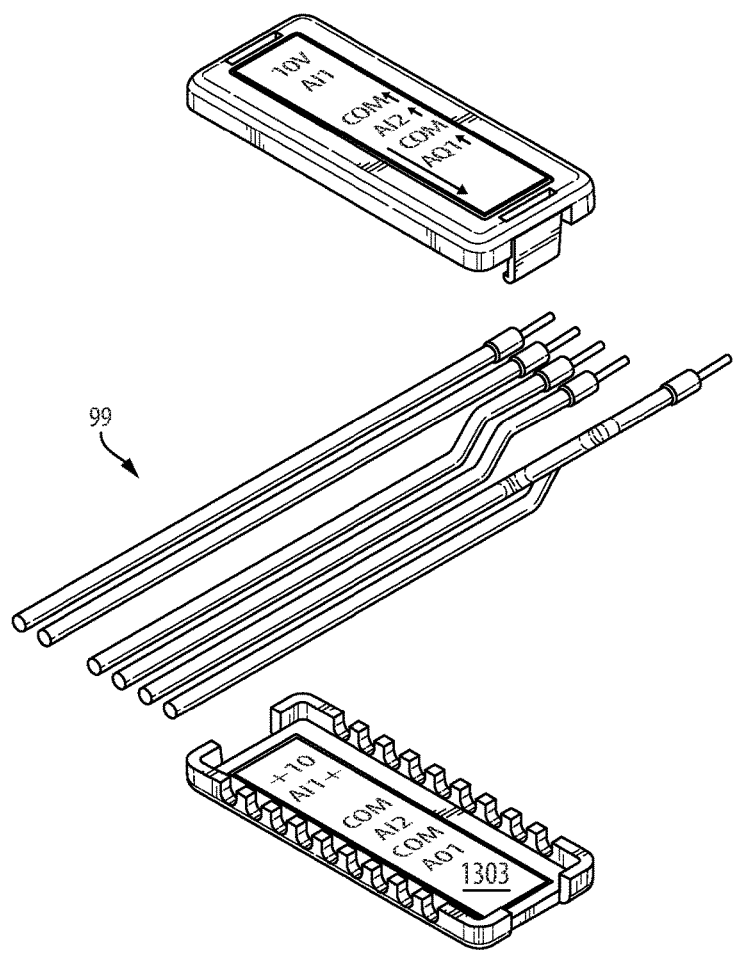
FIGS. 14A-14F illustrate an embodiment of a wire comb in accordance with this disclosure being installed over a plurality of wires (FIGS. 14A, 14B, 14C, and 14D) when the plurality of wires are connected to a first device (not shown), showing an embodiment of first indicia (shown in FIG. 12A) on an inside of the comb assembly, and an embodiment of second device (FIG. 14E) and second indicia (FIG. 14F) on an outside of the comb assembly correlating to terminals of the second device, wherein the second device requires repositioning of at least one wire (already shown bent into position in FIGS. 14A-14D) for which the second indicia includes an arrow to indicate where to reposition the wire.
Figure 14B:
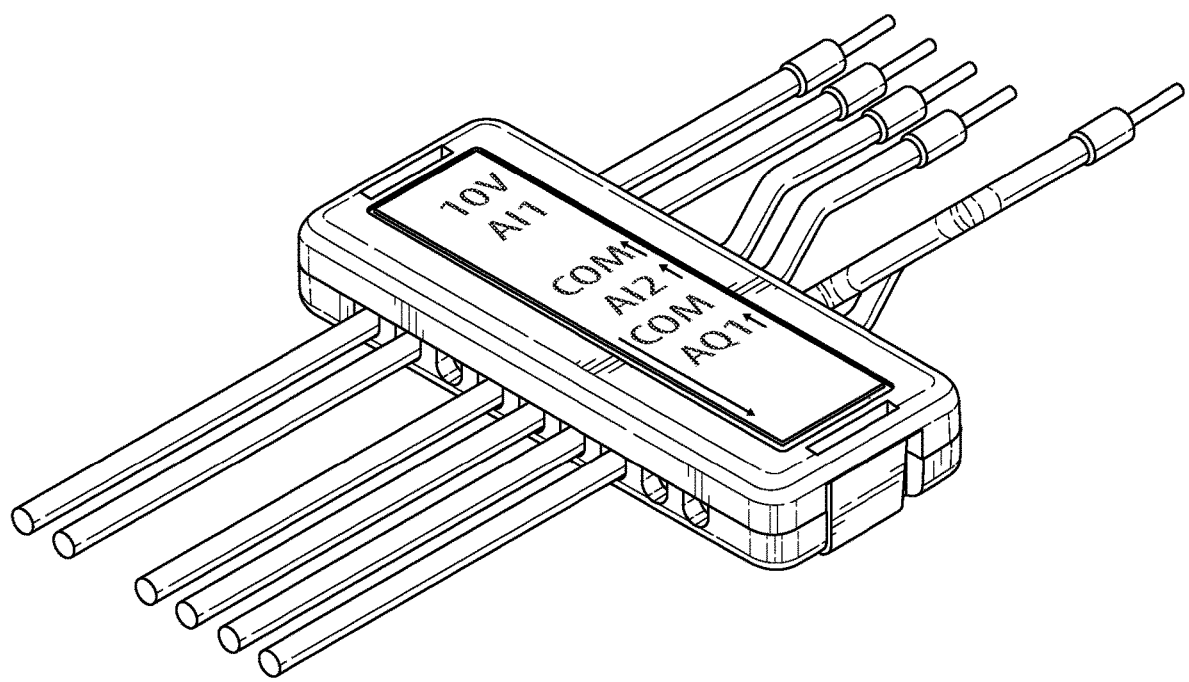
Figure 14C:
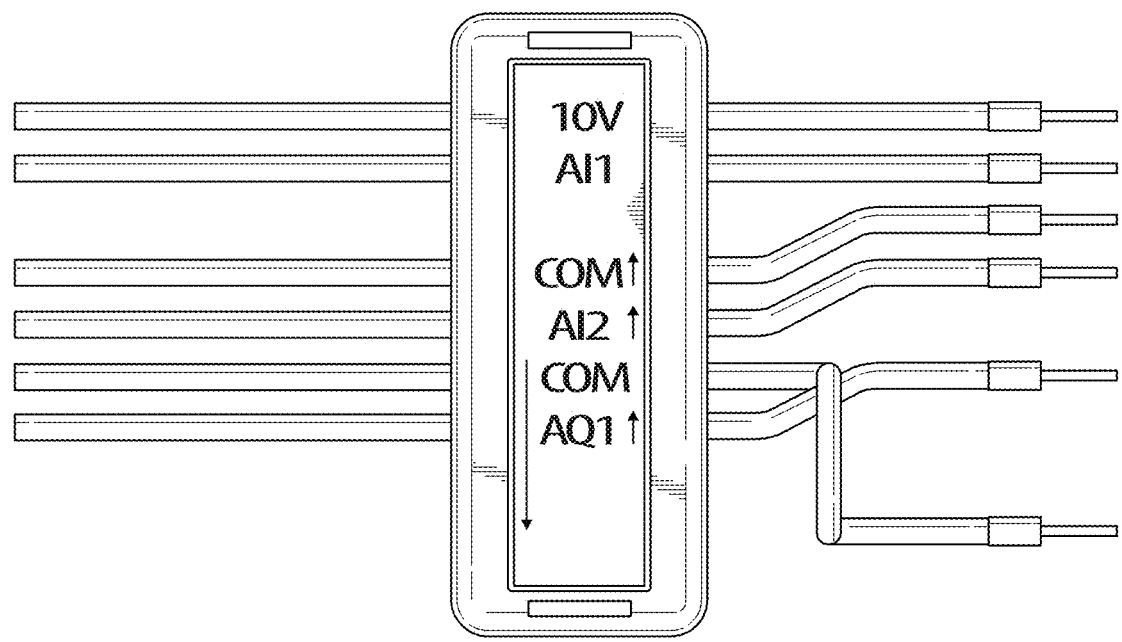
Figure 14D:
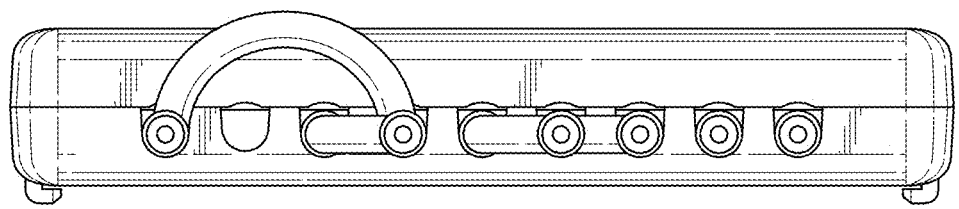
Figure 14E:
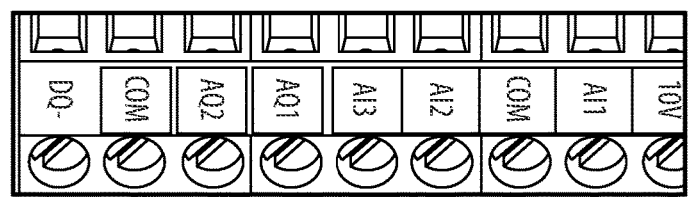
Figure 14F:
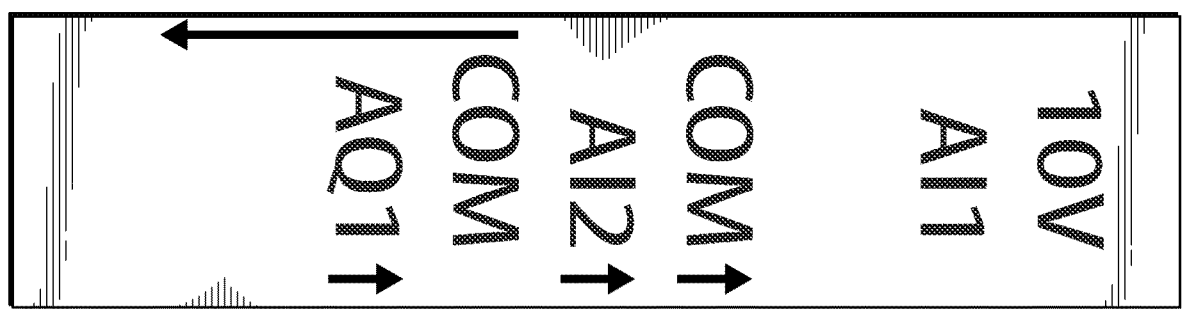
Figure 15A:
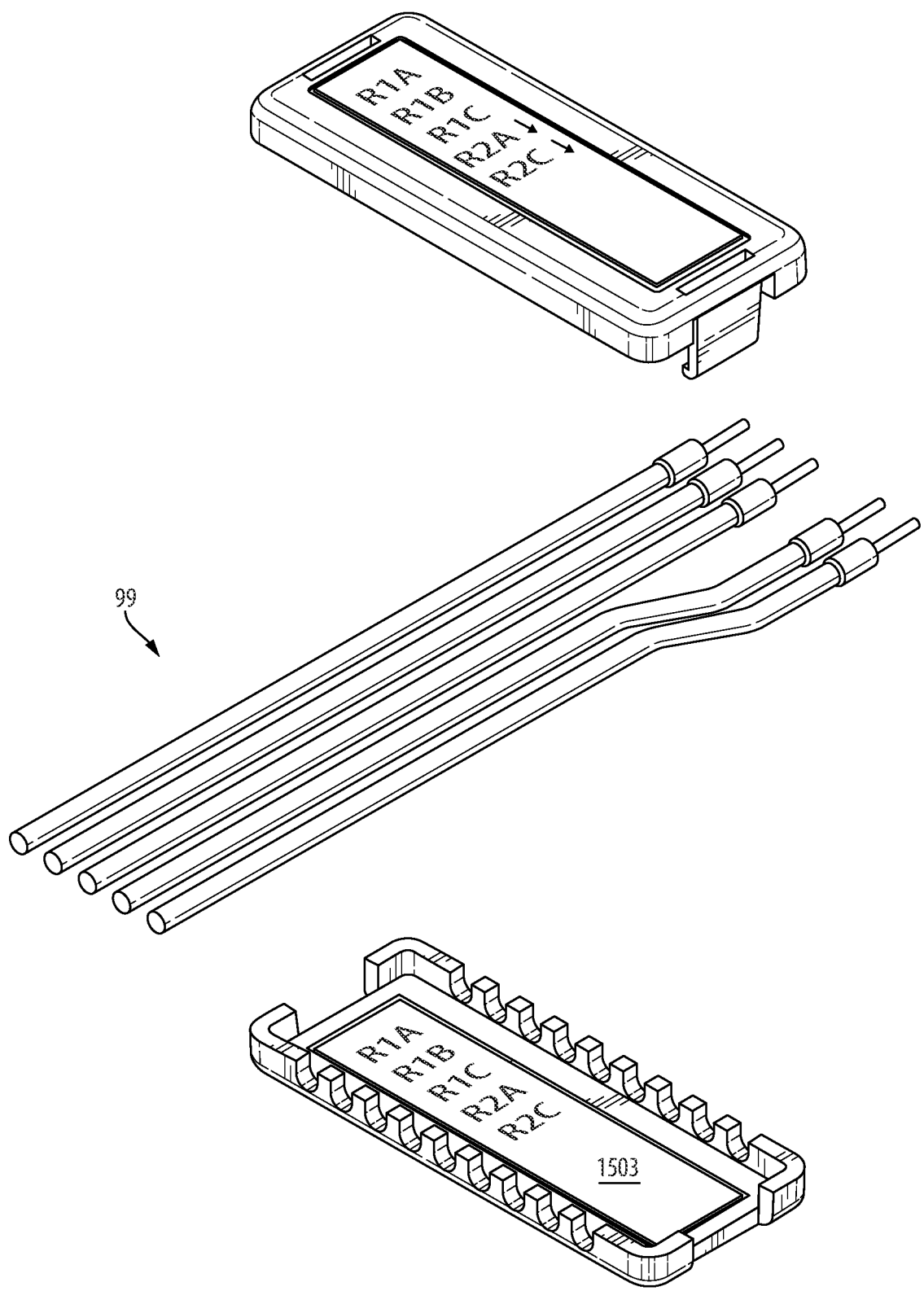
FIGS. 15A-15H illustrate an embodiment of a wire comb in accordance with this disclosure being installed over a plurality of wires (FIGS. 15A, 15B, 15C, and 15D) when the plurality of wires are connected to a first device (FIG. 15E), showing an embodiment of first indicia (FIG. 15F) on an inside of the comb assembly, and an embodiment of second device (FIG. 15G) and second indicia (FIG. 15H) on an outside of the comb assembly correlating to terminals of the second device, wherein the second device requires repositioning of at least one wire (already shown bent into position in FIGS. 12A-12D) for which the second indicia includes an arrow to indicate where to reposition the wire.
Figure 15B:
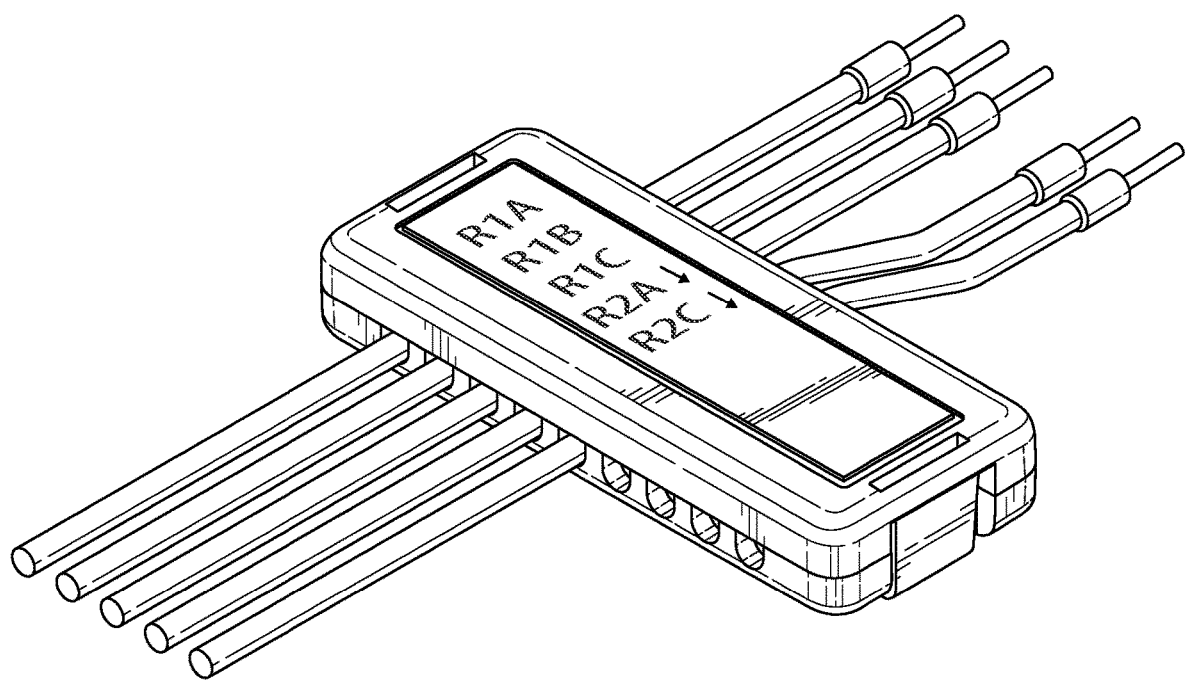
Figure 15C:
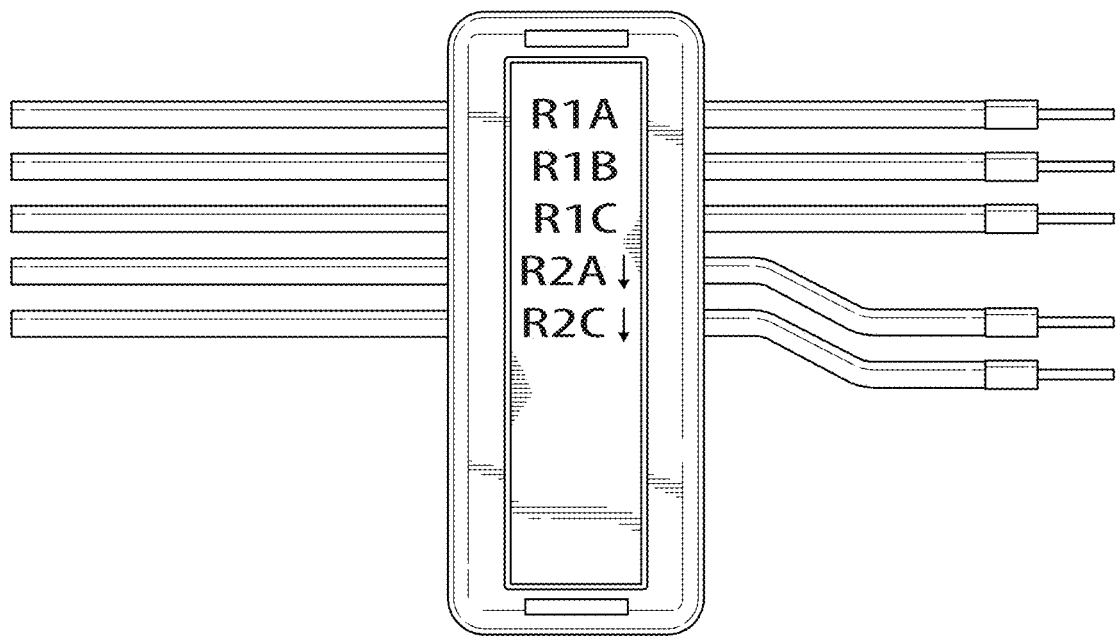
Figure 15D:
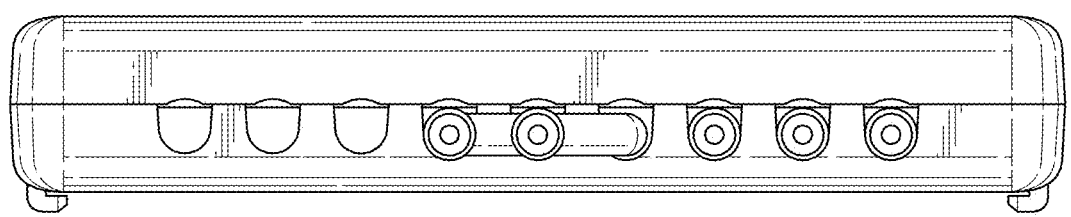
Figure 15E:
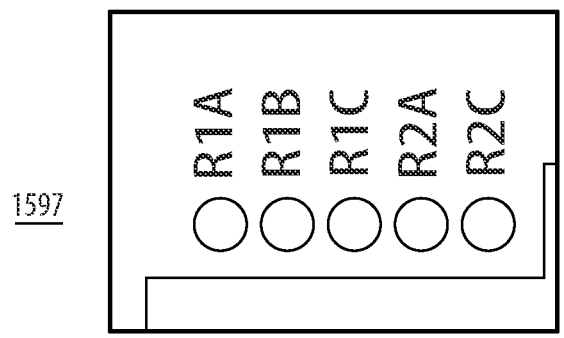
Figure 15F:
Figure 15G:
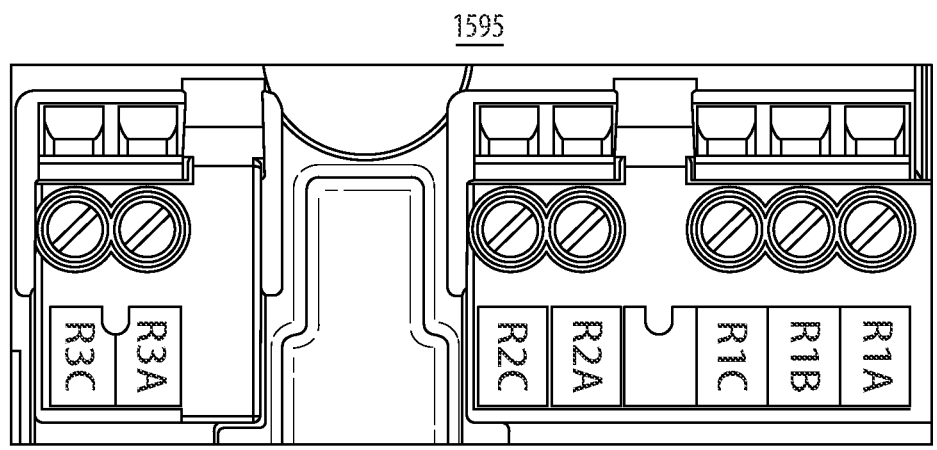
Figure 15H:
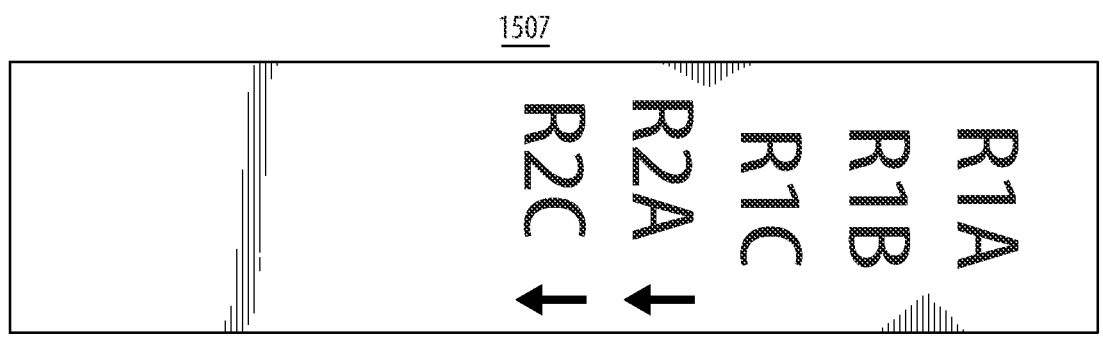

In certain embodiments, e.g., the first indicia 103 can be configured such that the plurality of wires 97 are organized in a different arrangement such that the arrangement is the same or similar to the terminal arrangement of the second device (e.g., as shown in the middle and right portions of the schematic diagram of FIG. 10). In this regard, the wires 97 can be made to be straightened for installation into the second device if the terminal arrangement of the first device and the second device are different. In any case, the first indicia 103 can be configured to cause ordering of the plurality of wires 97 so that the wires 97 correlate to the second indicia 107 (whether straightened or otherwise) when the comb assembly 200 is in the closed state (e.g., in order to indicate the correct wires for installation in the corresponding terminals of the second device after the wires 97 are removed from the first device).

In certain embodiments, the comb assembly 200, 600 can include a first housing portion 211, 611 and a second housing portion 213, 613 configured to assemble together. The first housing portion 211, 611 can include the interior surface 205, 605 having the first indicia 103.

The first housing portion 211, 611 can define a rim structure 215, 615 (e.g., having segmented sides) extending away from the interior surface 205, 605. In certain embodiments, the rim structure 215, 615 can substantially form a tray, wherein the first indicia 205, 605 are disposed within the tray.

The rim structure 215, 615 can include comb teeth 217a, 217b, 617a, 617b configured to receive a wire or the plurality of wires 99 between adjacent teeth (e.g., between adjacent teeth 217a). The comb teeth 217a, 217b, 617a, 617b can form the openings 201, 601 and/or a portion thereof. For example, as shown in the embodiments of FIGS. 1A-8C, the comb teeth 217a, 217b, 617a, 617b of the first housing portion 211, 611 can form a large portion 219, 619 of the openings 211, 611 and the second housing portion 213, 613 can form a small portion 221 of the openings 211, 611. For example, the second housing portion 213, 613 can include a similar tray shape (e.g., defined by a second rim structure as shown) to the first housing portion 211, 611 and define aligning low teeth that align with the comb teeth. However, it is contemplated that the openings 211, 611 can be formed in any suitable proportion by the first housing portion 211, 611 and the second housing portion 213, 613 such that the plurality of wires 99 can be arranged relative to the first indicia 107. In this regard, having larger portions 219, 619 of or all of the openings 211, 611 defined by the first housing portion 211, 611 can allow better lateral and/or frictional retaining of the wires 99 when being inserted into the first housing portion 211, 611. The small portions 221, 621 can be configured to allow accommodation for a larger size of wire. Certain embodiments may not include the small portions 221, 621.

In certain embodiments, the rim structure 215, 615 can include a first rim portion 215a, 615a and a second rim portion 215b, 615b disposed on an opposite side of the interior surface 205, 605 relative to the first rim portion 215a, 251b. The first rim portion 215a, 251b can have first comb teeth 217a, 617a and the second rim portion 215b, 615b can have second comb teeth 217b, 617b.

The first comb teeth 217a, 617a and second comb teeth 217b, 617b can be aligned to form a plurality of slots (e.g., pathways formed between opening portions 219, 619 for wires 99 to cross over the first indicia 107). As shown, the first indicia 103 can include a wire indication relative to each of the plurality of slots (e.g., text positioned between opposing portions 219, 619).

The second housing portion 213, 613 can be configured to clip to the first housing portion 211, 611. In certain embodiments, the second housing portion 213, 613 can be hinged to the first housing portion 211, 611 (e.g., via a mechanical or living hinge connection). As shown, in certain embodiments the second housing portion 213, 613 and the first housing portion 211, 611 can be separate pieces that assemble together (e.g., with one or more clips).

The comb assembly 200, 600 can include a plurality of clips 229, 629a, 629b configured to connect the first housing portion 211, 611 to the second housing portion 213, 613. In certain embodiments, the plurality of clips 629a, 629b can include arrow clips (e.g., inward as shown in the embodiment of FIG. 1A, and/or outward as shown in the embodiment of FIG. 5A). In certain embodiments, e.g., as shown in FIGS. 5A-8C, the first housing portion 611 and/or second housing portion 613 can include corresponding clip apertures 631a, 631b configured to receive the arrow clips. Any other suitable clip type is contemplated herein. As shown, the clip apertures 631a, 631b can be integrally formed with the first housing portion 611, and the arrow clips 629a, 629b can be integrally formed with the second housing portion 613. It is contemplated that the clips 629a, 629b and clip apertures 631a, 631b can be associated with either the first housing portion 611 or the second housing portion 613, or any combination thereof.

In certain embodiments, the arrow clips 629a, 629b can be outer facing arrow clips as shown in the embodiments of FIG. 5A. In certain embodiments, the arrow clips 229 can be inner facing arrow clips 229 as shown in the embodiment of FIG. 1A. As shown in the embodiment of FIG. 1A, the clip apertures 231 can be recesses formed in the first housing portion 211 as opposed to an enclosed aperture as shown in the embodiment of FIG. 5A. Any suitable clip apertures are contemplated herein.

Referring to FIGS. 5F-8C, in certain embodiments, the first housing portion 611 and/or the second housing portion 613 can include one or more orientation features configured to orient the first housing portion 611 relative to the second housing portion 613 when attached together in the closed position. In certain embodiments, the one or more orientation features can include one or more rabbet protrusions 625a, 625b on the first housing portion 611 or and/or second housing portion 613, and one or more corresponding rabbet recesses 627a, 627b on the other of the first housing portion 611 and/or the second housing portion 613 that are configured to receive the one or more rabbet protrusions 625a, 625b. In certain embodiments, the one or more rabbet protrusions 625a, 625b and/or rabbet recesses 627a, 627b can include a plurality of rabbet protrusions 625a, 625b and rabbet recesses 627a, 627b, e.g., as shown. At least two of the plurality of rabbet protrusions 625a, 625b can have different sizes and be positioned to require the first housing portion 211, 611 and the second housing portion 213, 613 to attach together in a predetermined orientation. For example, as shown, one side of the second housing portion 613 can include longer rabbet protrusions 625a, and the opposite side can include shorter rabbet protrusions 625b, while one side of the first housing portion 611 can include longer rabbet recesses 627a, and the opposite side can include shorter rabbet recesses 627b to correspond to the different size rabbet protrusions 625a, 625b. It is contemplated that either or both of the first housing portion 611 or second housing portion 613 can include rabbet protrusions and/or rabbet recesses. Any number and/or arrangement of rabbet protrusions and recesses that cause orientation of the first housing portion 611 relative to the second housing portion 613 are contemplated herein.

In certain embodiments, the one or more orientation features can be or include (e.g., with or without the rabbet protrusions and recesses) the plurality clips 629a, 629b such that the clips 629a, 629b have different sizes such that the first housing portion 611 and the second housing portion 613 connect together in a predetermined orientation (e.g., such that the clips allow only one way to clip the parts together). For example, as shown in FIGS. 5D and 5E, clip 629a can be smaller (e.g., less wide) than clip 629b. The clip apertures 631a, 631b can be similarly sized to receive their respective clip 629a, 629b. For example the clip 629b can be sized to not fit within the clip aperture 631a, preventing reverse attachment of the first housing portion 611 to the second housing portion 613.

Certain embodiments can include a cushion 123 configured to compress against the wires 99 retained within the openings 201, 601. The cushion 123 can be made of any suitable soft and/or compressible material (e.g., foam, rubber, etc.) and can be sized to provide a compressive force to the wires 99. In this regard, the wires 99 can be held tightly within the wire comb 100 and lateral movement/vibration of the wires 99 can be prevented. In certain embodiments, the cushion 123 can be adhered to the second housing portion 211, 611 and can extend past the small openings 221, 621 or second rim structure for example.

In certain embodiments, the first indicia 103 and the second indicia 107 can be relatively configured to cause straightening of the wires 99 for input into the second device. In certain embodiments, the first indicia 103 and second indicia 107 can be sticker labels.

Figure 9:
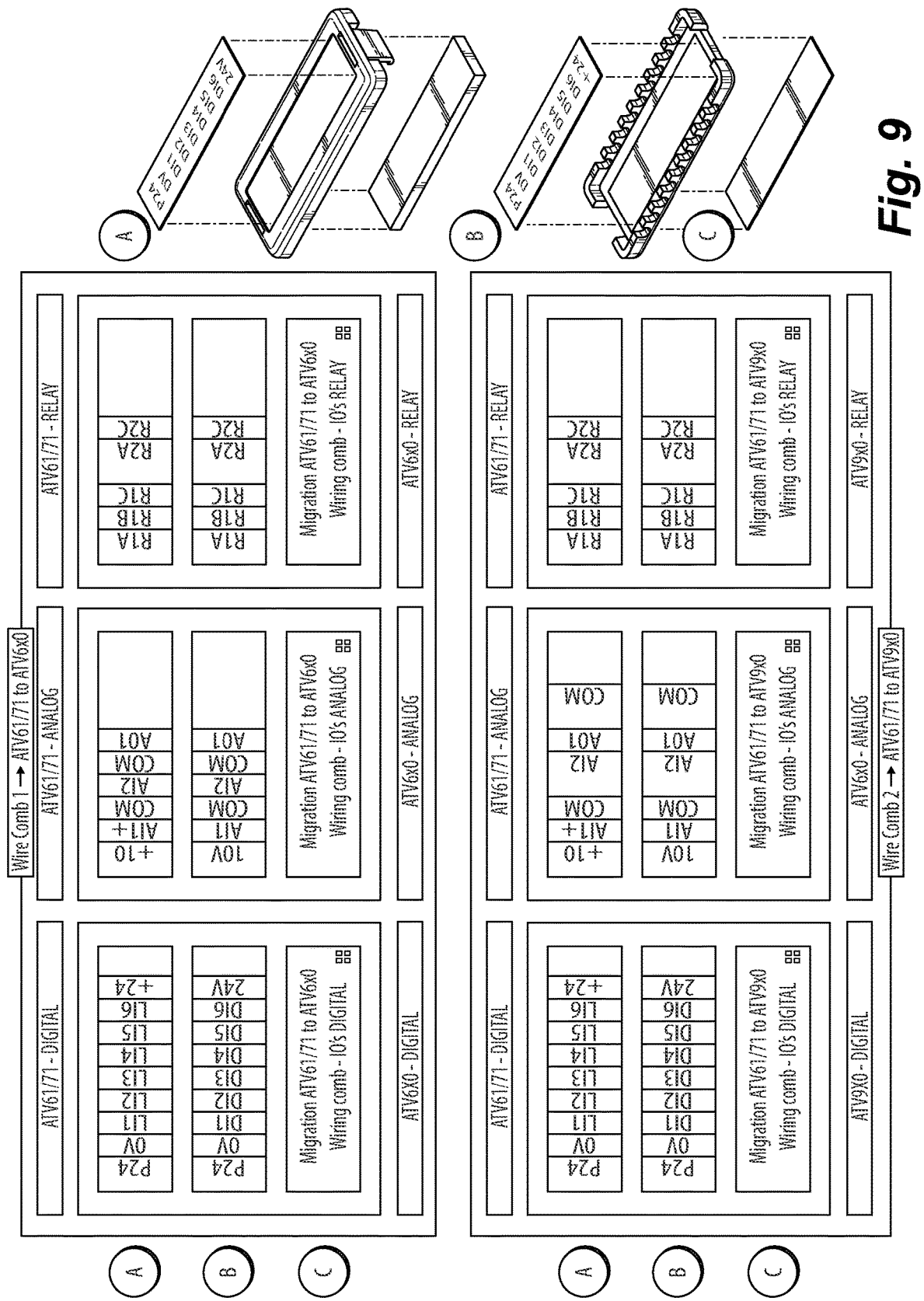
FIG. 9 is a schematic diagram showing an embodiment of a plurality of indicia (e.g., labels) for different applications and for use with wire combs disclosed herein.

In accordance with at least one aspect of this disclosure, a device conversion kit for replacing a first electrical device having a plurality of wires connected thereto can include a second electrical device having a plurality of wire terminals configured to be connected to the plurality of wires of the first device. The kit can also include a wire comb as disclosed herein, e.g., as described above (e.g., wherein the first indicia 103 include indicia associated with the first device, and the second indicia 107 include indicia associated with the second device). The kit can include a plurality of indicia to be applied to the comb assembly for various possible application (e.g., as shown in FIGS. 9 and 10).

In accordance with at least one aspect of this disclosure, a method can include organizing a plurality of wires within a wire comb (e.g., comb 100, 500) in accordance with first indicia on an interior surface of the wire comb, the first indicia associated with wire position and/or terminal nomenclature in a first device, closing the wire comb over the plurality of wires to retain the plurality of wires in a relative position to each other, removing the plurality of wires from the first device while the plurality of wires are held in the wire comb, and installing the plurality of wires into a second device in accordance with second indicia on an outer surface of the wire comb while the plurality of wires are held in the wire comb, the second indicia associated with wire position and/or terminal nomenclature in the second device. In certain embodiments, the method can also include removing the wire comb after installing the plurality of wires into the second device.

In accordance with at least one aspect of this disclosure, a wire comb can include a first housing portion 211, 611 defining a rim structure extending away from an interior surface 205, 605. The rim structure can include comb teeth configured to receive a wire or the plurality of wires between adjacent teeth. The rim structure can form side walls of the first housing portion 211, 611 such that the first housing portion 211, 611 forms a tray shape having an interior surface 205, 605. The wire comb can include a second housing portion 213, 613 configured to assemble with the first housing portion 211, 611. The wire comb can be or include any other suitable wire comb disclosed herein, e.g., as described above. The wire comb can have any other suitable structure disclosed herein, e.g., as described above (e.g., without indicia).

In accordance with at least one aspect of this disclosure, a wire comb for enabling faster wire exchange when migrating a plurality of electrical wires from at least one first device (e.g., device(s) being migrated from) to at least one second device (e.g., device(s) being migrated to) can include an upper portion (e.g., a second housing portion 213, 613 as disclosed herein) having an outer surface 209, 609 and an inner surface, the outer surface 209, 609 of the upper portion having an outer label with terminal position text associated with the plurality of electrical wires for the at least one second device (e.g., device(s) being migrated to), and the inner surface of the upper portion having a compression cushion disposed thereover. The wire comb can include a lower portion (e.g., a first housing portion 211, 611 as disclosed herein) having an outer surface and an inner surface, the inner surface of the lower portion having an inner label with terminal position text associated with the plurality of electrical wires for the at least one first device. The inner surface of the lower portion can also having a plurality of cavities (e.g., the opening portions as disclosed herein) formed therein, the plurality of cavities extending a predetermined depth from the inner surface to the outer surface of the lower portion and extending between first and second opposing sides of the lower portion, each of the plurality of cavities shaped to receive a respective electrical wire of the plurality of electrical wires, with the plurality of electrical wires capable of passing through the first and second opposing sides of the lower portion through the plurality of cavities. The upper portion of the wire comb can be configured to be removably coupled from the lower portion of the wire comb using at least one fastening means, and the compression cushion can be configured to exert a force on the plurality electrical wires to reduce or eliminate movement of the plurality of electrical wires in the wire comb when the plurality of wires are received in the plurality of cavities and the upper portion of the wire comb is coupled to the lower portion of the wire comb.

The at least one fastening means can include at least one fastening mechanism integrated into at least one of the upper portion and the lower portion. The at least one fastening mechanism can include at least one snap latch (e.g., the arrow clips as disclosed above). In certain embodiments, the at least one fastening mechanism can include at least one hinge.

The plurality of cavities can be configured to accommodate wires of various gauges. In certain embodiments, the wire comb can be molded or printed (or made with any other suitable method). The outer label can be printed, etched, or molded on the outer surface of the upper portion (or formed in any other suitable manner, e.g., stamped, integrally formed, etc.). The inner label can be printed or etched on the inner surface of the lower portion. In certain embodiments, at least one aspect of the terminal position text associated with the plurality of electrical wires for the at least one second device can be different from the terminal position text associated with the plurality of electrical wires for the at least one first device.

FIG. 9 is a schematic diagram showing an embodiment of a plurality of indicia (e.g., labels) for different applications and for use with wire combs disclosed herein. FIG. 10 is a schematic diagram showing the indicia of FIG. 9 being used to migrate wires from a first device 1097 to a second device 1095. As shown, the indicia can be one or more labels (e.g., with adhesive) that can be placed on or in the comb housing. Various labels can be provided with a wire comb for a user to apply for a specific application (e.g., for specific devices and/or for IO types such as digital, analog, and relay). As shown, each set can include first indicia (e.g., labels A) and second indicia (e.g., labels B). In certain embodiments, third indicia (e.g., labels C) can be includes to inform which devices the labels apply to for the proper application.

FIGS. 11A-11H illustrate an embodiment of a wire comb in accordance with this disclosure being installed over a plurality of wires (FIGS. 11A, 11B, 11C, and 11D) when the plurality of wires are connected to a first device (FIG. 11E), showing an embodiment of first indicia 103 (FIG. 11F) on an inside of the comb assembly 200, 600, and an embodiment of second device (FIG. 11G) and second indicia 107 (FIG. 11H) on an outside of the comb assembly 200, 600 correlating to terminals of the second device, wherein all wires are shown in a same position as organized from the first device.

FIGS. 12A-12H illustrate an embodiment of a wire comb in accordance with this disclosure being installed over a plurality of wires (FIGS. 12A, 12B, 12C, and 12D) when the plurality of wires are connected to a first device (FIG. 12E), showing an embodiment of first indicia 103 (FIG. 12F) on an inside of the comb assembly 200, 600, and an embodiment of second device (FIG. 12G) and second indicia 107 (FIG. 12H) on an outside of the comb assembly 200, 600 correlating to terminals of the second device, wherein the second device requires repositioning of at least one wire (already shown bent into position in FIGS. 12A-12D) for which the second indicia 107 includes an arrow to indicate where to reposition the wire.

FIGS. 13A-13G illustrate an embodiment of a wire comb in accordance with this disclosure being installed over a plurality of wires (FIGS. 13A, 13B, and 13C) when the plurality of wires are connected to a first device (FIG. 13D), showing an embodiment of first indicia 103 (FIG. 13E) on an inside of the comb assembly 200, 600, and an embodiment of second device (FIG. 13F) and second indicia 107 (FIG. 13G) on an outside of the comb assembly 200, 600 correlating to terminals of the second device, wherein the second device requires repositioning of at least one wire (already shown bent into position in FIGS. 12A-12D) for which the second indicia 107 includes arrows to indicate where to reposition the wires.

FIGS. 14A-14F illustrate an embodiment of a wire comb in accordance with this disclosure being installed over a plurality of wires (FIGS. 14A, 14B, 14C, and 14D) when the plurality of wires are connected to a first device (not shown), showing an embodiment of first indicia 103 (shown in FIG. 12A) on an inside of the comb assembly 200, 600, and an embodiment of second device (FIG. 14E) and second indicia 107 (FIG. 14F) on an outside of the comb assembly 200, 600 correlating to terminals of the second device, wherein the second device requires repositioning of at least one wire (already shown bent into position in FIGS. 14A-14D) for which the second indicia 107 includes an arrow to indicate where to reposition the wire.

FIGS. 15A-15H illustrate an embodiment of a wire comb in accordance with this disclosure being installed over a plurality of wires (FIGS. 15A, 15B, 15C, and 15D) when the plurality of wires are connected to a first device (FIG. 15E), showing an embodiment of first indicia 103 (FIG. 15F) on an inside of the comb assembly 200, 600, and an embodiment of second device (FIG. 15G) and second indicia 107 (FIG. 15H) on an outside of the comb assembly 200, 600 correlating to terminals of the second device, wherein the second device requires repositioning of at least one wire (already shown bent into position in FIGS. 12A-12D) for which the second indicia 107 includes an arrow to indicate where to reposition the wire.

Embodiments can include a snap together wire comb (e.g., for drive evolution to newer drives). Embodiments can include a wire comb having and outer wire comb label, a wire comb snap latch part (e.g., made from polycarbonate), a foam cushion with adhesive backing, an inner wire comb label, and a wire comb snap receiver made (e.g., from polycarbonate) with the inner wire comb label disposed therein. The foam cushion can be adhered to an inner surface of the snap latch part (e.g., the second housing portion disclosed above).

Embodiments of a method can include opening the wire comb and holding the base support, inserting the wire comb behind the wires, selecting the right slot for each wire following the marks and terminal identification, closing the wire comb cover, screwing out all wires from the old terminal, remove the old device and install the new device, identifying the terminal marks for each wire in the terminal, and screwing in each wire following the mark identification. The method can include verify if each wire is well tight. Embodiments of a method can include removing the wire comb cover, and then removing the base support.

Embodiments of a wire comb can hold existing wires in the right position for the new device. When opened, the user can see the inner label with terminal positions for the old device. When closed, the user can see the outer label with terminal positions for the new device. The wires can be secured in the wire comb during installation to prevent unwanted movement of the wires.

Embodiments enable faster exchange of wires between old and new devices (e.g., to reduce installation times). Embodiments reduce the likelihood of mixing up wires (e.g., to increase safety of installation). Embodiments can hold wires in place during installation. Embodiments of a wire comb can include labels with terminal positions for an old device and new device, accounting for differences in terminal positions and naming conventions between the old device and the new device. Embodiments can be made of plastic or other suitable insulating material to be electrical insulated.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A wire comb, comprising:
   a comb assembly defining a plurality of openings configured to organize and retain a plurality of wires associated with a first device, wherein the comb assembly is configured to allow insertion and organization of the plurality of wires in an open state, and to retain the plurality of wires in a relative position in a closed state, wherein the comb assembly includes a first housing portion and a second housing portion configured to assemble together;
   first indicia disposed within the comb assembly on an interior surface of at least a portion of the comb assembly, wherein the first indicia are positioned to underlay the plurality of wires to allow the wires to be organized over the first indicia in accordance with the first indicia in the open state, wherein the first indicia indicate wire position for the plurality of wires relative to the plurality of openings; and
   second indicia disposed on an outer surface of the comb assembly, wherein the second indicia are positioned to correspond to the plurality of wires retained within the comb assembly to allow the wires to be installed into terminals of a second device in accordance with the second indicia, wherein the first housing portion includes the interior surface having the first indicia, wherein the first housing portion defines a rim structure extending away from the interior surface, wherein the rim structure includes comb teeth configured to receive a wire or the plurality of wires between adjacent teeth.

2. The wire comb of claim 1, wherein the first indicia are different than the second indicia.

3. The wire comb of claim 1, wherein the rim structure includes a first rim portion and a second rim portion disposed on an opposite side of the interior surface relative to the first rim portion, wherein the first rim portion has first comb teeth and the second rim potion has second comb teeth.

4. The wire comb of claim 3, wherein the first comb teeth and second comb teeth are aligned to form a plurality of slots, wherein the first indicia include a wire indication relative to the plurality of slots.

5. The wire comb of claim 4, wherein the second housing portion is configured to clip to the first housing portion.

6. The wire comb of claim 5, wherein the first housing portion and/or the second housing portion includes one or more orientation features configured to orient the first housing portion relative to the second housing portion when attached together in the closed position.

7. The wire comb of claim 6, wherein the comb assembly includes a plurality of clips configured to connect the first housing portion to the second housing portion, wherein the one or more orientation features include the plurality clips such that the clips have different sizes such that the first housing portion and the second housing portion connect together in a predetermined orientation.

8. The wire comb of claim 7, wherein the plurality of clips include arrow clips and corresponding clip apertures configured to receive the arrow clips.

9. The wire comb of claim 8, wherein the clip apertures are integrally formed with the first housing portion, and the arrow clips are integrally formed with the second housing portion.

10. The wire comb of claim 9, wherein the arrow clips are inner facing arrow clips.

11. The wire comb of claim 9, wherein the arrow clips are outer facing arrow clips.

12. The wire comb of claim 6, wherein the one or more orientation features includes one or more rabbet protrusions on the first housing portion or and/or second housing portion, and one or more corresponding rabbet recesses on the other of the first housing portion and/or the second housing portion that are configured to receive the one or more rabbet protrusions.

13. The wire comb of claim 12, wherein the one or more rabbet protrusions and/or rabbet recesses include a plurality of rabbet protrusions and rabbet recesses, at least two of the plurality of rabbet protrusions having different sizes and positioned to require the first housing portion and the second housing portion to attach together in a predetermined orientation.

14. The wire comb of claim 1, wherein the first indicia and the second indicia are relatively configured to cause straightening of the wires for input into the second device.

15. The wire comb of claim 1, wherein the first indicia and second indicia are sticker labels.

16. A device conversion kit for replacing a first electrical device having a plurality of wires connected thereto, comprising:
   a second electrical device having a plurality of wire terminals configured to be connected to the plurality of wires of the first device; and
   a wire comb as recited in claim 1.

17. A wire comb, comprising:
- a first housing portion defining a rim structure extending away from an interior surface, wherein the rim structure includes comb teeth configured to receive a wire or plurality of wires between adjacent teeth, wherein the rim structure forms side walls of the first housing portion such that the first housing portion forms a tray shape having an interior surface;
- first indicia disposed on an interior surface of the first housing portion, wherein the first indicia are positioned to underlay the wire or plurality of wires to allow the wire or plurality of wires to be organized over the first indicia in accordance with the first indicia, wherein the first indicia indicate wire position for the wire or plurality of wires relative to the comb teeth; and
- a second housing portion configured to assemble with the first housing portion.

18. The wire comb of claim 17, wherein the rim structure includes a first rim portion and a second rim portion disposed on an opposite side of the interior surface relative to the first rim portion, wherein the first rim portion has first comb teeth and the second rim potion has second comb teeth.

19. The wire comb of claim 18, wherein the first comb teeth and second comb teeth are aligned to form a plurality of slots.

20. The wire comb of claim 19, wherein the second housing portion is configured to clip to the first housing portion.

* * * * *